United States Patent
Liu et al.

(10) Patent No.: US 6,208,466 B1
(45) Date of Patent: Mar. 27, 2001

(54) MULTILAYER REFLECTOR WITH SELECTIVE TRANSMISSION

(75) Inventors: Yaoqi Joe Liu, Maplewood; Bruce A. Nerad, Oakdale; Laurence R. Gilbert, Marine on St. Croix; Robert L. Brott, Woodbury; Michael F. Weber, Shoreview; Kelly M. Roscoe, Orono, all of MN (US); John A. Wheatley, Ascot Berkshire (GB)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/199,602

(22) Filed: Nov. 25, 1998

(51) Int. Cl.⁷ .................................................. G02B 5/28
(52) U.S. Cl. .................................. 359/584; 359/590
(58) Field of Search .......................... 359/584–590; 283/91, 94

(56) References Cited

U.S. PATENT DOCUMENTS

| | | | |
|---|---|---|---|
| 3,124,639 | 3/1964 | Kahn | 88/65 |
| 3,610,729 | 10/1971 | Rogers | 350/157 |
| 3,711,176 | 1/1973 | Alfrey, Jr. et al. | 350/1 |
| 3,860,036 | 1/1975 | Newman, Jr. | 138/45 |
| 4,126,727 | * 11/1978 | Kaminski | 359/586 |
| 4,446,305 | 5/1984 | Rogers et al. | 528/348 |
| 4,520,189 | 5/1985 | Rogers et al. | 528/331 |
| 4,521,588 | 6/1985 | Rogers et al. | 528/363 |
| 4,525,413 | 6/1985 | Rogers et al. | 428/212 |
| 4,705,356 | * 11/1987 | Berning et al. | 359/590 |
| 4,720,426 | 1/1988 | Englert et al. | 428/344 |
| 4,854,670 | 8/1989 | Mellor | 350/166 |
| 5,005,935 | 4/1991 | Kunikane et al. | 350/96.16 |
| 5,188,760 | 2/1993 | Hikmet et al. | 252/299.01 |
| 5,211,878 | 5/1993 | Reiffenrath et al. | 252/299.63 |
| 5,235,443 | 8/1993 | Barnik et al. | 359/37 |
| 5,269,995 | 12/1993 | Ramanathan et al. | 264/171 |
| 5,294,657 | 3/1994 | Melendy et al. | 524/270 |
| 5,316,703 | 5/1994 | Schrenk | 264/1.3 |
| 5,319,478 | 6/1994 | Fijnfschilling et al. | 359/53 |
| 5,389,324 | 2/1995 | Lewis et al. | 264/171 |
| 5,448,404 | 9/1995 | Schrenk et al. | 359/584 |

(List continued on next page.)

FOREIGN PATENT DOCUMENTS

| | | | |
|---|---|---|---|
| WO 95/27919 | 4/1995 | (WO) | G02B/27/28 |
| WO 95/17303 | 6/1995 | (WO) | B32B/7/02 |
| WO 95/17691 | 6/1995 | (WO) | G02B/5/30 |
| WO 95/17692 | 6/1995 | (WO) | G02B/5/30 |
| WO 95/17699 | 6/1995 | (WO) | G02F/1/1335 |
| WO 96/19347 | 6/1996 | (WO) | B32B/7/02 |
| WO 97/01440 | 1/1997 | (WO) . | |
| WO 97/01610 | 1/1997 | (WO) | C09J/7/02 |
| WO 97/01774 | 1/1997 | (WO) | G02B/1/10 |
| WO 97/01781 | 1/1997 | (WO) . | |
| WO 97/32226 | 9/1997 | (WO) | G02B/5/30 |

OTHER PUBLICATIONS

Aceves, A.B. et al., Snell's laws at the interface between nonlinear dielectrics, physics letters A vol. 129, No. 4, May 23, 1988, pp. 231–235.

(List continued on next page.)

*Primary Examiner*—Jon Henry
(74) *Attorney, Agent, or Firm*—William D. Miller

(57) ABSTRACT

In a multilayer dielectric reflector, treating the surface of the reflector selectively increases the amount of light transmitted through the reflector. Various surface treatments can be used to permit light to transmit through the reflector that would otherwise be reflected by the reflector. In one such reflector, different portions of the surface have different coupling efficiencies for coupling light having a high propagation angle into the multilayer reflector. Those portions having higher coupling efficiencies on each side of the reflector have a higher degree of transmission.

21 Claims, 27 Drawing Sheets

U.S. PATENT DOCUMENTS

| | | | |
|---|---|---|---|
| 5,486,935 | 1/1996 | Kalmanash | 359/37 |
| 5,486,949 | 1/1996 | Schrenk et al. | 359/498 |
| 5,612,820 | 3/1997 | Schrenk et al. | 359/498 |
| 5,629,055 | 5/1997 | Revol et al. | 428/1 |
| 5,686,979 | 11/1997 | Weber et al. | 349/96 |
| 5,699,188 | 12/1997 | Gilbert et al. | 359/584 |
| 5,721,603 | 2/1998 | De Vaan et al. | 349/194 |
| 5,744,534 | 4/1998 | Ishiharada et al. | 524/442 |
| 5,751,388 | 5/1998 | Larson | 349/96 |
| 5,767,935 | 6/1998 | Ueda et al. | 349/112 |
| 5,770,306 | 6/1998 | Suzuki et al. | 428/328 |
| 5,783,120 | 7/1998 | Ouderkirk et al. | 264/134 |
| 5,793,456 | 8/1998 | Broer et al. | 349/98 |
| 5,808,794 | 9/1998 | Weber et al. | 359/487 |
| 5,825,542 | 10/1998 | Cobb, Jr. et al. | 359/487 |
| 5,825,543 | 10/1998 | Ouderkirk et al. | 359/494 |

OTHER PUBLICATIONS

Aceves, A.B. et al., Reflection and transmission of self–focused channels at nonlinear dielectric interfaces, Optics Letters, vol. 13, No. 11, Nov. 1998, pp. 1002–1004.

Aceves, A.B. et al., Theory of Beam Reflection, Transmission, Trapping and Breakup at Nonlinear Optical Interfaces, Journal de Physique, Colloque C2, Supplement au No. 6, Tome 49, juin 1988.

Burneau, A. and B. Humbert, Temperature effect on a titled birefringent filter in a tunable laser: A limitation for Raman spectroscopy, J. Appl. Phys. 66(12), Dec. 15, 1989, pp. 5702–5706.

Chen, Pin Ao, A novelty optical filter with multilayer coating of ZnO–CdTe, J. Appl. Phys. 75(1), Jan. 1, 1994, pp. 611–612.

DeBell, Gary W., Douglas H. Harrison, Editors, Optical Coatings, Applications and Utilization, vol. 50, pp. 43–67.

Dupertuis, M.A. and M. Proctor, Generalization of complex Snell–Descartes and Fresnel laws, J. Opt. Soc. Am., vol. 11, No. 3, Mar. 1994, pp. 1159–1166.

Fisher, S.P. Et al., Characterization of optically variable film using goniospectroscopy, SPIE vol. 2262, p. 107–115.

Gourley, S.J. and P.H. Lissberger, Optical scattering in multilayer thin films, Optica Acta, 1979, vol. 26, No. 1, 117–143.

Greiner, Horst, Robust optical coating design with wvolutionary strategies, Applied Optics, vol. 35, No. 28, Oct. 1, 1996, pp. 5477–5483.

Haupt, Randy L. and Marc Cote, Snell's Law Applied to Finite Surfaces, IEEE Transactions on Antennas and Propagation, vol. 41, No. 2, Feb. 1993, pp. 227–235.

Jullien, R. and R. Botet, Light scattering by fractal aggregates: a Monte–Carlo method in the geometrical optics limit, J. Phys. France 50 (1989) 1983–1994.

Kunitsyn, S.D. et al., Violation of Snell's law in the reflection of light pulses from a screen in nonlinear media, Tech. Phys. Lett. 19(3), Mar. 1993, pp. 144–145.

Kunitsin, S.D. et al., Optical Beam Reflection in Nonlinear Media: The Violation of Snell's Law, Mol. Cryst. Liq. Cryst. Sci. Technol.—See B: Nonlinear Optics, 1992, vol. 3, pp. 349–356.

Litzman, O., The microscopical theory of reflection and transmission of light by a spatial dispersive dielectric slab and the Ewald dynamical theory of diffraction.

Lue, Juh–Tzeng and Yann–Shyh Hor, Optical filters constructed from multilayers of dielectric and thin metallic films operating in the anomalous skin effect region, J. Opt. Soc. Am., vol. 6, No. 6, Jun. 1989, pp. 1103–1105.

Maruyama, Kimio and Eiji Shimizu, Analysis of the characteristics of Light Emitting Diode by Ray Tracing Method, mem. Fac. Eng. Osaka City Univ. vol. 27, pp. 45–52 (1986).

Monga, Jagdish C., Electric field distribution in multilayer thin–film polarizers, Journal of Modern Optics, 1989, vol. 36, No. 3, 389–398.

Mouchart, Jacques et al., Modified MacNeille cube polarizer for a wide angular field, Applied Optics, vol. 28, No. 14, Jul. 15, 1989, pp. 2847–2853.

Perilloux, B.E., Dominant wavelength sensitivity of thin-–film color filters to spectral centering, Applied Optics, vol. 35, No. 28, Oct. 1, 1996, pp. 5535–5539.

Schesser, Joel and George Eichmann, Propagation of Plane Waves in Biaxially Anisotropic Layered Media, Journal of the Optical Society of America, vol. 62, No. 6, Jun. 1972, pp. 786–791.

Scobey, Mike and Paul Stupik, Stable ultra–narrow bandpass filters, SPIE vol. 2262, pp. 37–46.

Shao, Zhongxing, Refractive indices for extraordinary waves in uniaxial crystals, Physical Review E., vol. 52, No. 1, Jul. 1995, pp. 1043–1048.

Shao, Zhongxing and Chen Yi, Behavior of extraordinary rays in uniaxial crystals, Applied Optics, vol. 33, No. 7, Mar. 1, 1994, pp. 1209–121.

Snyder, Allen W. and John D. Love, Reflection at a Curved Dielectric Interface–Electromagnetic Tunneling, IEEE Transactions on Microwave Theory and Techniques, vol. MTT–23, No. 1, Jan. 1975, pp. 134–141.

Turner, A.F., S.D. Browning, Refracting boundaries in thin film glass lightguides, SPIE, vol. 204, Physical Properties of Optical Materials (1979), pp. 53–58.

Validov, M.A. et al, Use of rough surface to improve characteristics of neutral–density filter, Opt. Mekh. Promst. 58, 66–68 (Jul. 1991).

Wolf, Kurt Bernardo, The Euclidean root of Snell's Law I. Geometric polarization optics, J. Math Phys., 33(7), Jul. 1992, pp. 2390–2408.

Wolff, Laurance B., A diffuse reflectance model for dielectric surfaces, SPIE, vol. 1822 (1992), pp. 60–73.

Yamada, Yoshihide and Tadashi Takano, Dielectric Lens Antenna with Shaped Surfaces, The Transactions on the IECE of Japan, vol. E 62, No. 12, Abstracts, pp. 900–901. (Dec., 1979).

International Search Report for PCT/US 99/06378.

* cited by examiner

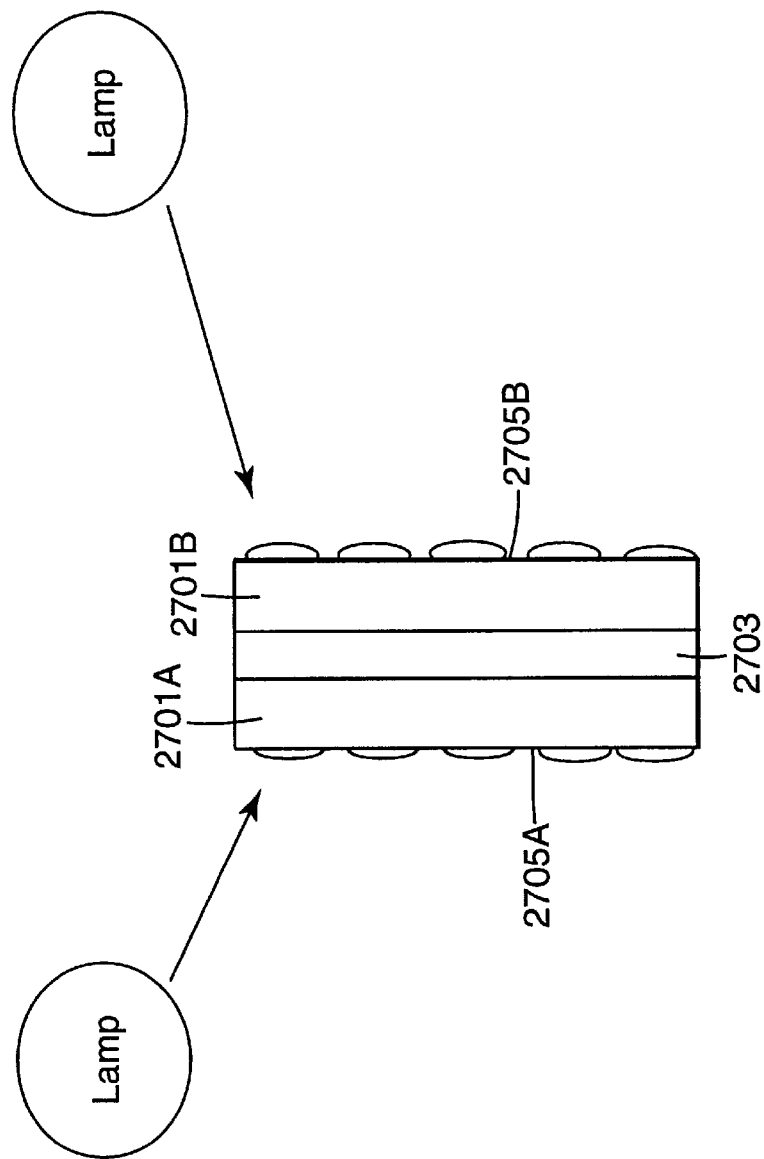

MULTILAYER REFLECTOR WITH SELECTIVE TRANSMISSION

BACKGROUND

This invention relates generally to multilayer reflectors, and more particularly multilayer dielectric reflectors having selective transmission.

Multilayer dielectric reflectors are often used to partition portions of the electromagnetic spectra between reflection and transmission. Multilayer dielectric reflectors typically employ a number of layers of at least two different materials within an optical stack. The different materials have refractive indices along at least one in-plane axis of the stack that are sufficiently different to substantially reflect light at the interface of the layers. Typical dielectric reflectors have very little absorption. Depending on its intended use, a dielectric stack can be constructed to reflect large areas of the electromagnetic spectrum, specific portions thereof, one polarization of light, etc. They can also be constructed to reflect light incident at normal and/or glancing angles of incidence.

One type of multilayer dielectric reflector is formed by sequentially depositing thin films on a substrate. Using this approach, the thickness of each individual layer can be carefully controlled to obtain a desired reflection band profile. An alternative approach to forming a dielectric reflector uses coextruded polymeric layers to form an optical stack. In each type of reflector, using more layers tends to improve the performance of the resulting dielectric reflector.

SUMMARY

Generally, the present invention relates to dielectric reflectors that are selectively treated to alter the transmission characteristic of the reflector. The reflection and transmission characteristics of the dielectric reflector can be selectively altered, for example, in local regions, by treating the surfaces to alter the propagation angles of light entering the reflector at one surface and allowing light extraction from the reflector at the opposing surface.

In one embodiment, the reflector includes a dielectric stack of optical repeating units including at least two different materials having different refractive indices. The stack has a critical angle at which light propagating in the stack will undergo total internal reflection at an interface of the stack with air. A first surface that is optically coupled to the dielectric stack is selectively treated to couple at least a portion of light incident on the first surface into the dielectric stack at a propagation angle above the critical angle. A second surface is selectively treated to couple at least a portion of the light propagating in the dielectric stack at an angle above the critical angle out of the stack. The coupling efficiency, for coupling light into or out of the stack with a propagation angle above the critical angle, is different for different regions of the dielectric stack on at least one surface.

A number of dielectric reflectors are suitable for use in connection with various embodiment of the invention. Suitable reflectors include, polymeric multilayer mirror and polarizing films, vapor-deposited dielectric mirrors and the like. Various treatments can be used to selectively couple light into and out of the stack. Such reflectors, selectively treated, can be used as part of a number of useful articles. Uniformly illuminated signs, for example, can be made where the indicia on the sign can be changed by selective treatment on one side of the sign.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 27 illustrates a louver in accordance with one embodiment of the invention.

DETAILED DESCRIPTION

Figure 1:
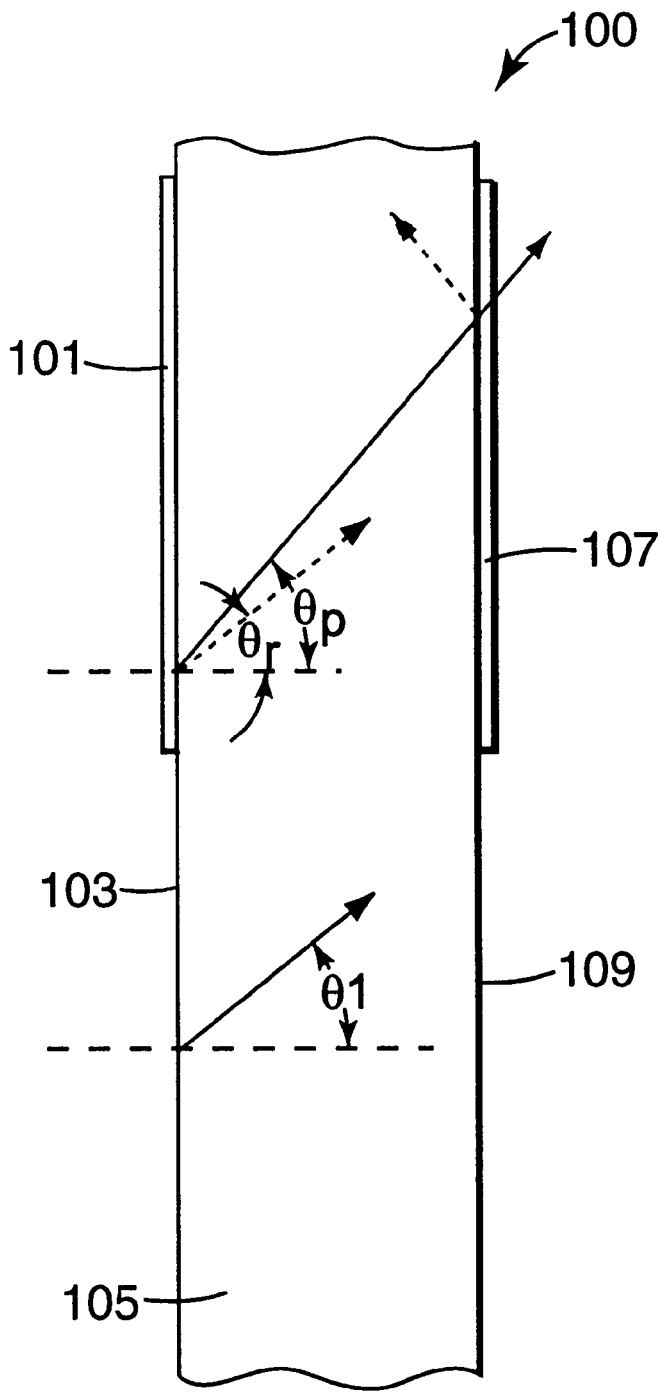
FIG. 1 is a schematic illustrating one embodiment of the invention.

The present invention is generally applicable to a number of different multilayer reflectors and is particularly suited to multilayer dielectric mirrors and polarizers. While specific examples of such reflectors are provided below to facilitate explanation of various aspects of the invention, it is not intended that the invention be limited to the specifics of the examples.

In accordance with various embodiments of the present invention the amount of light transmitted through a multilayer dielectric reflector can be selectively increased. A multilayer dielectric reflector is generally constructed of optical repeating units that form the basic building blocks of a dielectric stack. The optical repeating units typically include two or more layers of at least a high and a low refractive index material. Using these building blocks a multilayer reflector can be designed to reflect infrared, visible or ultraviolet wavelengths and one or both of a given orthogonal pair of polarizations of light. In general, the stack can be constructed to reflect light of a particular wavelength λ by controlling the optical thickness of the layers according to the relationship:

$$\lambda = (2/M) * D_r,$$

where M is an integer representing the order of the reflected light, and $D_r$ is the optical thickness of an optical repeating unit. For the first order reflection, the optical repeating unit is λ/2 thick. Simple ¼-wave stacks have each layer equal to λ/4. Broadband reflectors can include multiple ¼-wave stacks, a stack with a continuous gradation of the layer thickness throughout the stack, or combinations thereof. A typical multilayer reflector may further include non-optical layers. For example, a coextruded polymeric dielectric reflector may include protective boundary layers and/or skin layers used to facilitate formation of the reflector film and to protect the reflector. Polymeric optical stacks particularly suited to the present invention are described in published PCT Patent Application WO 95/17303, entitled Multilayer Optical Film and copending patent application Ser. No. 09/006,591 entitled Color Shifting Film, incorporated herein by reference. While various examples described below are ¼-wave stacks, the present invention is not limited to simple ¼-wave stacks and is more generally applicable to any dielectric stack such as, for example, computer optimized stacks and random layer thickness stacks.

Reflection by a dielectric stack of light at a particular wavelength is also dependent, in part, on the propagation angle through the stack. The multilayer reflector may be considered as having a reflection band profile (e.g., band center and bandedges) for light propagating in the stack at a particular angle. This band profile changes as the angle of propagation in the stack changes. The propagation angle in the stack is generally a function of the incident angle and the refractive indices of the materials in the stack and the surrounding medium. The change in the bandedge of the reflection band profile as the propagation angle in the stack changes can be considered a shift in bandedge of the stack with angle. Typically, for the materials under consideration, the bandedge of the reflector for light at normal incidence shifts to about 80% of its normal incidence value when viewed at grazing incidence in air. Dielectric multilayers with metallic components, in contrast, do not exhibit such dramatic shifts.

Although most dielectric stacks comprise discrete layers, similar angular behavior exists for rugate filters or any film having a periodic but continuously varying index as a function of depth into the film. In addition, materials with a chiral structure such as cholesteric liquid crystals that reflect circular polarized light exhibit a similar shift in bandedge with angle of propagation of the light. In general, any Bragg reflector, including exotic materials such as ordered stacks of spherical particles such as opal, will exhibit this effect, and are included in the present invention.

The angular dependence of the reflection band profile (e.g., bandedge shifting with angle) results from a change in the effective layer thickness. In the case of birefringent dielectric layers, a change in the effective index of refraction with angle of incidence also impacts the reflection band profile. The former always dominates, and the reflection band shifts towards shorter wavelengths as the angle increases from normal incidence if either positive or negative birefringent materials are used in the stack. While the total path length through a given layer increases with angle, the change in band position with angle does not depend on the change in the total path length through a layer with angle. Rather, the band position depends on the difference in path length between light rays reflected from the top and bottom surfaces of a given layer. This path difference decreases with angle of incidence as shown by the familiar formula n*d*cos θ which is used to calculate the wavelength λ to which a given layer is tuned as a ¼ λ thick layer. For negative uniaxial birefringent layers such as biaxially oriented PET and PEN, the effective index n decreases with angle of incidence for p polarized light as does cos θ, although the latter decreases more rapidly. For stacks containing negative uniaxial birefringent layers, the decrease in effective index of that layer with angle of incidence for p-polarized light will cause the band center for p-polarized light to move at a higher rate with angle of incidence than does the band center for s-polarized light. The bandwidth of a given stop band increases with angle of incidence for s-polarized light, while for p-polarized light, the band width may decrease or increase with angle of incidence depending on the relative signs of the in-plane and out-of plane (z-axis) index differentials. In certain cases, the low wavelength (blue) bandedges for s and p-polarized light will remain coincident over all angles of incidence while the long wavelength (red) bandedges will separate as a function of incidence angle. A thorough discussion of this topic can be found in the above referenced Color Shifting Film pending patent application Ser. No. 09/006,591.

The above description describes how the bandedge of the reflection band profile changes as a function of angle. As used herein, bandedge generally refers to the region where the multilayer reflector changes from substantial reflection to substantial transmission. This region may be fairly sharp and described as a single wavelength. In other instances, the transition between reflection and transmission may be more gradual and may be described in terms of a center wavelength and bandwidth. In either case, however, a substantial difference in reflection and transmission exists on either side of the bandedge.

For light of a given wavelength, the bandedge of a dielectric stack may also be treated as a function of propagation angle in the dielectric stack. As light at the particular wavelength propagates in the stack at increasing propagation angles (measured from an axis normal to the interface of the repeating units), the light approaches the bandedge. In one example, at high enough propagation angles, the stack will become substantially transparent to that particular wavelength of light and the light will transmit through the stack. Thus, for a given wavelength of light, the stack has an associated propagation angle below which the stack substantially reflects the light and another propagation angle, above which the stack substantially transmits the light. Accordingly, in certain multilayer stacks, each wavelength of light may be considered as having a corresponding angle below which substantial reflection occurs and a corresponding angle above which substantial transmission occurs. The sharper the bandedge, the closer these two angles are for the associated wavelength.

The above description describes the manner in which light at a particular wavelength in a given stack will shift from reflection to transmission with increasing angle of propagation. It will be appreciated that as the bandedge shifts with propagation angle in the dielectric stack certain wavelengths of light may also shift from a transmissive state to a reflective state. Thus, for light at these wavelengths, the stack has an associated propagation angle above which the stack substantially reflects the light and a propagation angle below which the stack substantially transmits the light. Accordingly, each wavelength of light may be more generally considered as having a corresponding group of propagation angles at which the light is substantially reflected and another group of angles at which the light is substantially transmitted. Which of the two groups of propagation angles are larger depends on the band profile of the dielectric stack. The larger of the two groups, as described more fully below, will include a critical angle for which selective treatment of the surfaces of the dielectric stack can be used to couple light into and out of the stack with propagation angles at or above the critical angle.

Applying the above considerations permits one to design a dielectric stack which has desired reflection and/or transmission for a given bandwidth of light incident on the dielectric stack over a prescribed range of angles. For example, a broadband visible mirror may be constructed by extending the reflection bandwidth for light incident normal to the surface, beyond the visible spectrum to account for the propagation angular dependence of reflection by the multilayer stack. It will be appreciated, however, that Snell's law limits the maximum propagation angle in the dielectric stack for light incident from an isotropic medium on a planar surface. In general, to encompass the full visible spectrum in a mirror reflecting light incident over all angles, the bandwidth is extended such that the mirror reflects light which has a propagation angle at the maximum angle allowed by Snell's law for the particular materials used in the multilayer stack.

Referring to FIG. 1, a portion of a reflector 100 is shown. Portions 101 and 107 of opposing surfaces 103 and 109 of a multilayer dielectric stack 105 are treated to couple light into and/or out of the stack with a higher propagation angle in the stack. The dielectric stack 105 is generally a multilayer stack of optical repeating units designed to have a desired reflection band profile. The multilayer dielectric stack 105 may be any suitable multilayer reflector that uses layers of two or more dielectric materials having different refractive indices including coextruded polymeric birefringent multilayer reflectors, dielectric reflectors that are vacuum deposited and made from organic, inorganic, and/or isotropic materials, and the like. The stack 105 may also include one or more non-optical layers (e.g., skin layers forming the surfaces 103 and 109 of the dielectric reflector 105). The term stack is also intended to include any material with periodic variation in index such that it behaves as a Bragg reflector.

The treatments applied to the surfaces 103 and 109 are provided generally to couple light, having a propagation angle $\theta_p$ in the dielectric stack that is greater than an angle $\theta_r$ associated with the reflection bandedge of the stack, between the stack and the surrounding medium. Where the dielectric reflector is constructed as a broadband mirror for visible light incident over all angles in air, for example, the reflection angle $\theta_r$ corresponds to the maximum angle permitted in the stack by Snell's law and the angle at which total internal reflection (TIR) occurs for light exiting the stack. In this case, the surface treatments couple a portion of light into the stack at an angle greater than that permitted by Snell's law at a typical planar interface and couple a portion of light out of the stack which propagates in the stack at an angle that exceeds the angle for TIR. In such a case, the treatment must generally be optically coupled to the stack such that there are no intervening air interfaces between the treatment and the optical stack.

As described herein, the terms planar, parallel planes, and references to Snell's law, refer to localized areas of the film that can be approximated as planar. Angles of incidence then refer to the local tangent plane. Therefore, included are such films exhibiting simple or compound curvature. For example, films coated onto a cylinder or a sphere, or multilayer polymeric films rolled into a cylinder or otherwise formed (e.g., by thermoforming) into complex shapes, are included.

In the embodiment illustrated in FIG. 1, the amount of light transmitted through reflector 100 is increased where the surface has been treated. The amount of light reflected at the treated and untreated portions of the surface depends on the type of treatment and the construction of the film. Generally, it is desirable that the difference in transmission between the treated and untreated portions of the reflector 100 be sufficient to provide distinct contrast between the two regions. In the case of a broadband visible mirror, for example, in transmission one would observe essentially no light except at the treated portions. As described more fully below, a variety of different surface treatments can be applied to the surface to alter the propagation and exit surface reflection angles and the amount of light transmitted through the reflector. In certain instances it may be desired to transmit light through the treated portions at all wavelengths of incident light reflected by the dielectric stack at untreated portions of the surface. This is accomplished when the surface treatments couple each wavelength of light into and out of the dielectric stack at a propagation angle that renders the stack transmissive for the wavelength.

As noted above, in accordance with an embodiment of the invention the incident and exit surfaces of a dielectric reflector can be treated to selectively transmit light through the reflector. In this manner, various treatments may be selectively applied to portions of the dielectric reflector to create contrast between treated and untreated portions of the reflector or portions of the reflector having different treatments. For example, a mirror can be made which, when viewed from the exit side, transmits light in the treated locations only or transmits light differently in differently treated portions of the mirror. The amount of light selectively leaked through a reflector is determined in part by the efficiency at which light is coupled into and out of the dielectric stack at a propagation angle in the stack that is essentially transmissive. By varying the coupling efficiency of different locations on at least one surface of the reflector, a desired contrast may be obtained. In general, the coupling efficiency can be varied from no coupling to high coupling. For example, an otherwise highly efficient reflector, such as that disclosed in published PCT Patent Application WO 95/17303, entitled Multilayer Optical Film and incorporated herein by reference, may be selectively treated to permit significant transmission at the treated portions by coupling light into and out of the reflector at a propagation angle exceeding that permitted by Snell's law for light incident on the untreated portions of the surface. As described more fully below, various treatments may be applied to different portions of the surfaces to provide, for example, more gradual differences in contrast by varying the degree of coupling efficiency at those regions. Varying the degree of coupling may also be used to get uniform transmission through a non-uniformly lit reflector. Certain surface treatments or portions thereof can be a relatively easily applied to the dielectric reflector, increasing versatility. Additionally, in certain instances the treatment can be removed such that the reflector reverts to its untreated reflective nature.

As described above, effectively shifting the reflection bandedge of a dielectric reflector by increasing the propagation angle of light in the multilayer stack allows one to selectively permit light to be transmitted through the multilayer stack. In certain dielectric stacks, the angle at which the stack becomes transmissive to the incident light may be small enough to permit light to exit the stack without an exit surface treatment. In many dielectric stacks, however, like the broadband visible mirror, the transmissive propagation angles are above the critical angle for TIR at the planar exit surface of the stack. Thus, to allow the light to exit the stack, the exit surface is also treated to couple the high angle light out of the stack. As described more fully below, various surface treatments can be used to couple the high propagation angle light into and out of the stack. For example, scattering light within a medium having a refractive index more closely matching (relative to air) the refractive index of the stack materials can be used to couple the light into and out of the stack at high angles. Structured surfaces may also be used to alter the angle of the incident plane.

Where the incident surface and exit surface medium have the same refractive index and are immersed in the same isotropic medium (e.g., air), the angle for TIR at the exit surface is the same as the maximum propagation angle in the incident surface medium permitted by Snell's law. Thus, treatments that allow a light ray to enter the stack at a higher angle can also be used to allow the higher angle light to exit the multilayer stack at the exit surface. With certain dielectric reflectors it is possible to treat one entire surface while still leaking light only at those portions of the stack that are also treated on the opposing surface. While the present invention is generally applicable to any dielectric or Bragg reflector, the methods and treatments described herein are particularly suited for use with coextruded multilayer dielectric reflectors. Isotropic dielectric reflectors are typically deposited on a relatively thick substrate that tends to decrease the effect (e.g., by light exiting the sides of the substrate, decreasing registration of opposing side treatments, etc.). Coextruded dielectric reflectors, however, do not require a separate substrate.

Figure 2:
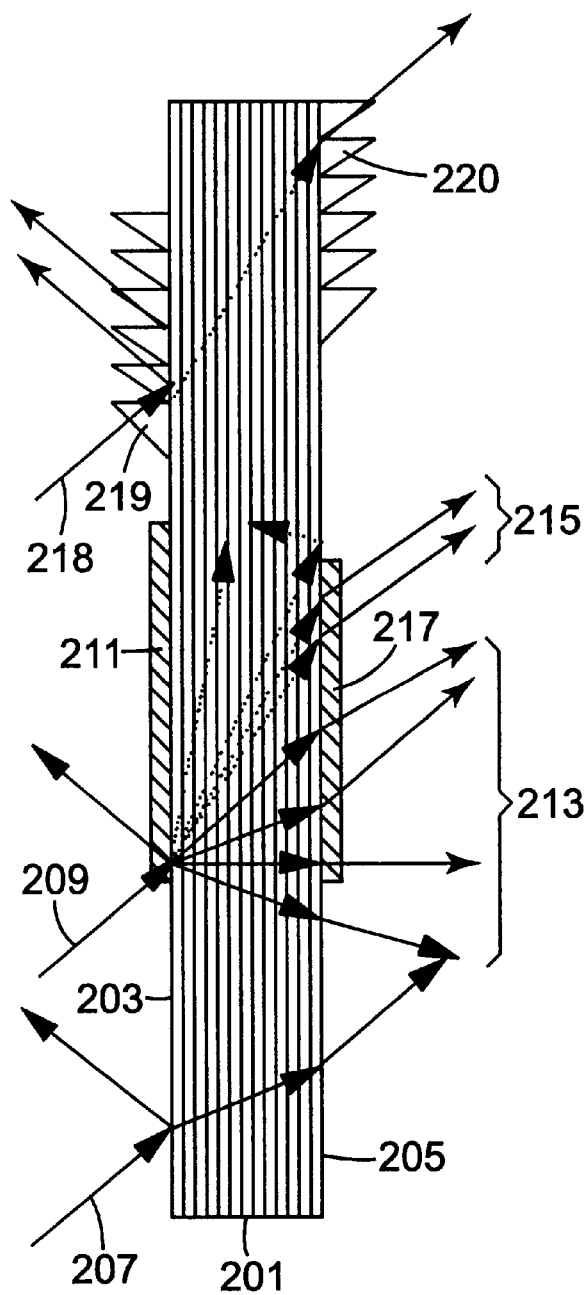
FIG. 2 is another schematic illustrating various embodiments of the invention.

As noted above, the surface of a multilayer reflector can be treated in a variety of ways to couple a portion of light between a surrounding medium and the reflector, the coupled light propagating in the reflector at an angle making the reflector transmissive to the light. FIG. 2 illustrates in schematic form the operation of two such coupling treatments. In FIG. 2, portions of opposing surfaces 203 and 205 of a multilayer reflector are treated to couple high angle propagating light into and out of the reflector 201. It is noted that the incident and exit sides of the reflector are generally interchangeable. To facilitate explanation, however, the two surfaces will be referred to as incident surface 203 and exit surface 205. As will be appreciated, the overall coupling efficiency of the two surfaces varies for different regions on the surface.

Light ray 207 is incident on an untreated potion of the incident surface 203. The light propagates in the multilayer stack at a maximum angle determined by Snell's law for light incident on the plane of the incident surface 203. In the case of a broadband mirror, light ray 207 will be reflected with an efficiency that depends on the construction of the multilayer stack. For example, when using a highly efficient coextruded multilayer stack like that disclosed in the above-referenced published PCT Patent Application WO 95/17303, less than 1% of the incident light will exit through the exit (back) surface 205 of the stack. Light ray 209 is incident on a portion 211 of the incident surface 203 which is treated to forward scatter the incident light over a wide range of angles into the multilayer reflector. Some of the light, though scattered, will have a propagation angle in the stack that is not greater than the angles permitted by Snell's law for light incident on the untreated portions of the stack. Then this light will be reflected by the stack to the same degree as light incident on the untreated portion of the incident surface 203, but will be more diffuse in its reflection.

Another portion 215 of light ray 209 will be scattered at angles above that at which the reflector is designed to reflect the light. Thus, the scattering effectively couples this portion of the incident light into the multilayer reflector at angles that are transmitted by the multilayer stack. If the reflector is a broadband mirror, for example, the maximum angle for reflection corresponds to the maximum angle permitted by Snell's law for light incident on the plane of the surface. In such a case, the higher angle rays under go TIR at the exit surface except at those portions 217 where the rear surface is also treated to couple the high propagation angle light out of the stack 201. As will be appreciated, by varying the coupling efficiency of high angle light along at least one surface of the reflector, the amount of light transmitted through the stack 201 will be higher at some regions (e.g., light ray 209) than at others (e.g., light ray 207). By controlling the placement and/or coupling efficiency of the surface treatments desired transmission profiles can be obtained.

FIG. 2 also illustrates the use of refractive optics to couple light between the surrounding medium and the reflective stack 201. Light ray 218 is incident on a portion 219 of the multilayer stack 201 that has a surface structure that is not parallel to the plane of the optical layers. Light ray 218 is refracted by the structured surface in a manner which effectively couples the light into the multilayer stack 201 at angles greater than that which would be permitted by Snell's law if the light were incident on a surface parallel to the layers. The exit surface is again treated to prevent TIR and couple the light out of the multilayer stack 218 without reflection. In the illustrated example, the light is coupled out of the stack by a second structure 220 applied to the exit surface 205. Because the structured coupling treatment more precisely defines the propagation angles at which light is directed into the stack, such an approach may be used to couple more light into and out of the stack at higher angles than a treatment, for example, that relies on the diffuse scattering of light.

As the above examples illustrate, a typical untreated multilayer dielectric reflector exhibits a direct relationship between the incident angle of light and the propagation angle in the stack (dictated by Snell's law). The relationship between incident angle and propagation angle may be changed by treating the surface to couple light with higher propagation angles between the stack and the surrounding medium (e.g., by scattering or refracting the light). The surface treatment may be in the form of additional layer(s) in optical contact with the stack, a texture applied to the surface and the like. The treatment may also be applied to another layer or material that is optically coupled to the surface of the optical stack (e.g., a skin layer). The larger the index of the stack layers, the less limitation there is on propagation angle in the stack. A low index layer that intervenes between a scattering layer and the dielectric mirror may reduce the maximum propagation angle in the stack.

As noted above, the angle to which the propagation angle must be increased in order to transmit through the multilayer stack will depend on the construction of the stack. For any thin film stack design with a given red bandedge at normal incidence, the position of the red band edge as a function of angle of incidence can be calculated using thin film modeling techniques known in the art. The shift of the bandedges of a simple quarter-wave stack is shown below as an illustrative example. The stack design utilized to illustrate this behavior is a quarter-wave stack of PEN ($n_o$=1.75, $n_e$=1.50) and PMMA (n=1.5) having a center wavelength of 855 nm at normal incidence. The long wavelength or red edge is at 900 nm at normal incidence (0°). In the limit of grazing incidence (90°) in air it shifts to 732 nm for s-polarized light and to 675 nm for p-polarized light. As the index of the incident medium is increased, this shift increases. Cases are shown for both p-polarized and s-polarized light, with the greater shift occurring for p-polarized light. When the bandedge shifts to a value below 400 nm, the dielectric mirror becomes essentially transparent and uncolored. In the case of a sharp bandedge a shift to below 420 nm is sufficient to render the mirror essentially transparent to the average observer.

Figure 3A:
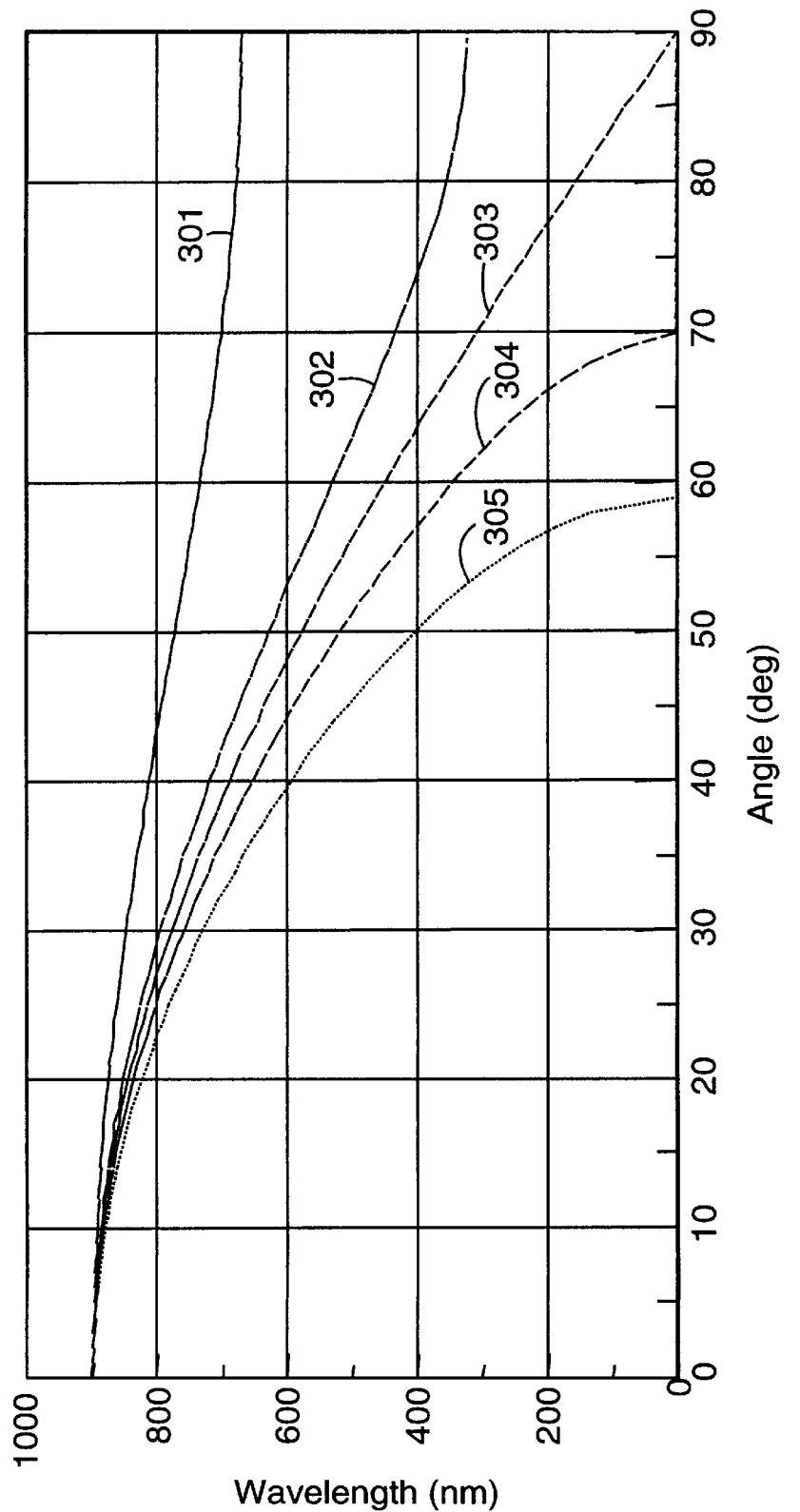
FIGS. 3A and 3B illustrate bandedge shifting as a function of incident media refractive index changes for p- and s-polarized light respectively.
Figure 3B:
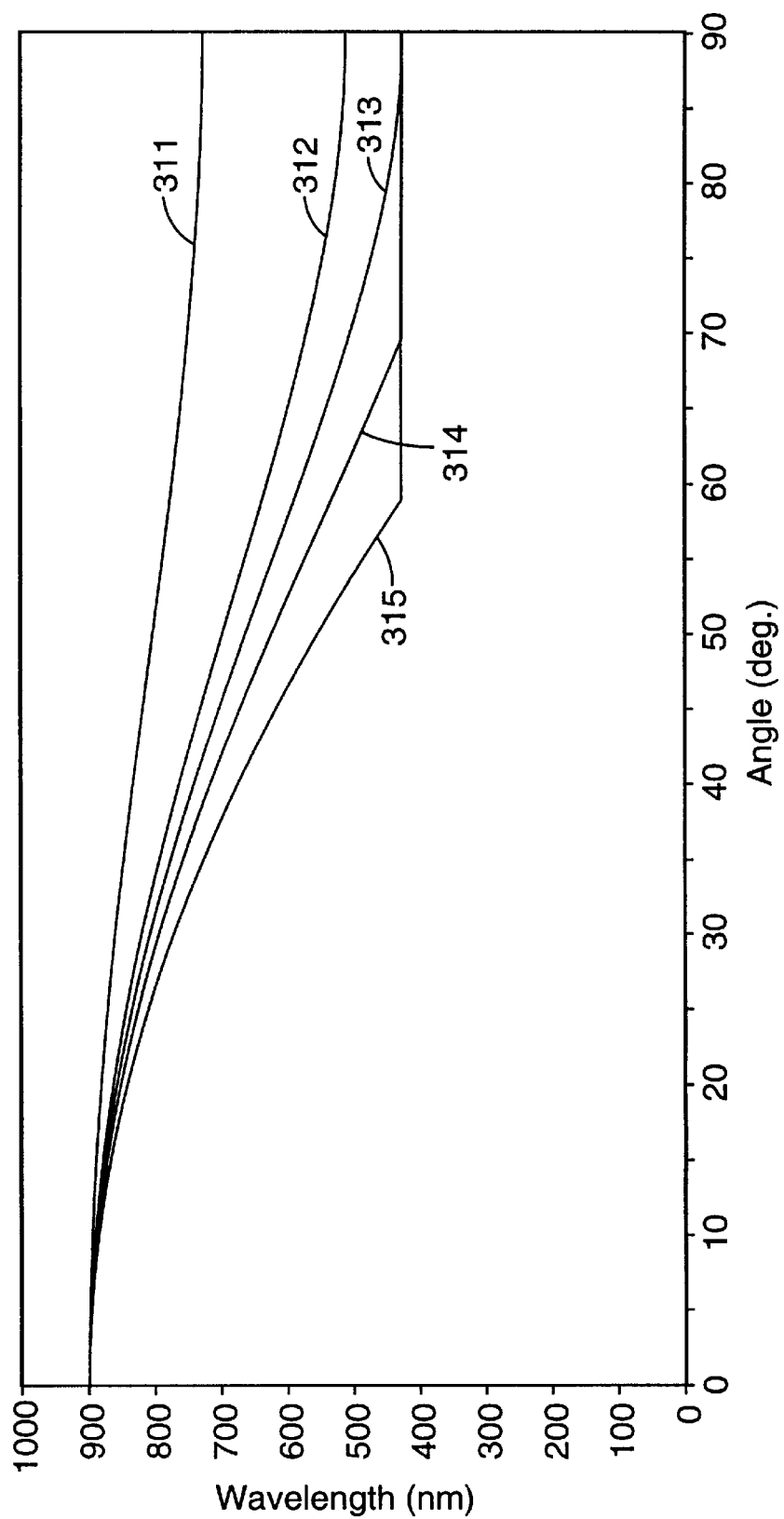

The graphs of FIGS. 3A and 3B illustrate, for p- and s-polarized light, respectively, the predicted red bandedge position as a function of angle of incidence for a variety of incident media for the above-described quarter-wave stack. Specifically curves 301 and 311 are for an incident medium index of 1.0 (air), curves 302 and 312 are for an index of 1.4, curves 303 and 313 are for an index of 1.5, curves 304 and 314 are for an index of 1.6 and curves 305 and 315 are for an index of 1.75.

The highest index medium will yield the lowest angle for transparency, which in FIG. 3A is about 50° for p-polarized light. This band is not completely transparent for s-polarized light at 50° as illustrated in FIG. 3B i.e., some reflection still occurs for the shorter wavelengths of visible light as the bandedge does not shift below 425 nm for any incident medium. This will color the transmitted light slightly, depending on the slope of the bandedge of a given stack. To shift the red bandedge completely below 400 nm, a different stack design can be used, such as e.g. different stack indices, or starting with a shorter red bandedge wavelength at normal incidence.

In accordance with the above-guidance, a treatment can be suitably selected where the band shifts below 400 nm for at least a portion of all wavelengths of incident light to render the multilayer stack essentially clear to the light coupled at higher angles. As the index in the incident medium increases, the wavelength shift with angle becomes larger and the angle at which the long wavelength bandedge decreases below 400 nm also decreases. For example, with an incident medium having an index of 1.5, p-polarized rays scattered at an angle greater than 64° will be transmitted through the dielectric reflector. With an index of 1.75 (in an isotropic material), the angle is decreased to about 50° for p-polarized light. For higher indices, on the order of 4.0 for example, the angle would be decreased below 20°. Thus, where scattering particles are dispersed in a binding layer having a very high index of refraction, the angle that a ray must be scattered is small.

Table I shows the scattering angle in the incident media at which the long wavelength bandedge of a simple quarter-wave stack, having an 855 nm center wavelength and a long wavelength bandedge of 900 nm at normal incidence, shifts to wavelengths below 400 nm.

TABLE I

| Index of Incident medium | Angle for S Pol (deg) | Angle for P Pol (deg) |
| --- | --- | --- |
| 1.0 | none | none |
| 1.1 | none | none |
| 1.2 | none | none |
| 1.3 | none | none |
| 1.4 | none | 74.0 |
| 1.5 (PMMA) | none | 63.7 |
| 1.6 | none | 57.1 |
| 1.63 (CoPEN) | none | 55.6 |
| 1.7 | none | 52.3 |
| 1.75 | none | 50.2 |
| 1.8 | none | 48.3 |
| 1.9 | none | 45.0 |
| 2.0 | none | 42.2 |
| 2.5 | none | 32.6 |
| 3.0 | none | 26.6 |
| 4.0 | none | 19.7 |

Note in table I that there is no angle in any incident media that will shift the bandedge below 400 nm for s-polarized light, while for p-polarized light, the bandedge shifts below 400 nm in many cases. From FIG. 3B however, note that at high angles the bandedge for the s-polarized component can be shifted to about 430 nm with incident media having indices of 1.5 or higher, which will permit a majority of blue light to pass through the mirror.

It will be appreciated that for air as the incident medium, Snell's law limits the angle in the optical layers to a maximum of about 35° in PEN, about 38° in CoPEN, and about 42° in PMMA (materials well suited for use in coextruded multilayer dielectric reflector films). This limit imposed by Snell's law constrains the dielectric bandshift to about 25%. When the shifted bandedge of the stack is located between approximately 400 and 700 nm, the multilayer stack appears colored. By increasing the propagation angle of light rays within the multilayer stack, the bandshift can be increased to more than 50%. In the low index material of the stack, the maximum propagation angle can be increased to 90 degrees. This allows a reflection band of such materials, normally positioned between 400 nm and 900 nm to shift completely below the visible range, resulting in high transmission levels and reduced reflection. Color shift with angle and transmission through the multilayer stack may be enhanced, depending on the treatment used to increase the propagation angle, the band positioning, and the observation angle.

When the index of the incident material is greater than the lowest index in the stack, total internal reflection (TIR) can occur within the stack, especially if some of the low index layers are substantially thicker than a ¼ wave. The TIR at the interface of a low index layer will prevent the light from reaching the back surface of the film where it could be extracted by an appropriate surface treatment. In the case of a birefringent surface treatment such as, for example, a birefringent skin layer having either a geometrically structured surface or internal scattering centers, the TIR angles may not be identical for s- and p-polarized light. In either case, the occurrence of TIR within the stack itself will impose a limit on the extent to which the bandedge may be shifted for a given stack. Depending on the optical stack design, the phenomenon commonly known as frustrated total internal reflection may occur, allowing substantial quantities of light to pass through the stack, even though the angle is greater than the critical angle for the low index layers. One major requirement of such a stack design is that none of the low index layers be substantially thicker than on the order of a ¼ wave.

While the above description is primarily directed to light scattered by a treatment applied to the surface of the multilayer stack, it will be appreciated that the discussion is also applicable to light rays having an increased angle in the multilayer stack due to surface refraction. Generally, for high incident angles from a high index medium, total reflection may occur at the interface of a lower index medium. If the low index layer has a small thickness, compared to the wavelength of light, the total reflection can be frustrated, and some light can leak through the interface. It should also be appreciated that intermediate layers may be provided between the optical layers of the multilayer stack and the treatment used to change the propagation angle. For example, skin layers may surround the optical layers of the multilayer stack. In this case, the refractive index difference between the skin layers and the material provided to alter the propagation angle through the stack must be considered.

As noted above, various treatments may be applied to the surfaces of the dielectric reflector to increase transmission through the reflectors Typically, enhanced transmission is obtained when both sides of the reflector are treated. The type of treatment used will affect the amount of increased transmission through the sample. The treatment may be applied as an additional layer or coating to the surface of the dielectric reflector or incorporated into an existing layer of the reflector (e.g., incorporation of diffuser particles into skin layers, protective boundary layers, etc.). The spectral characteristics of the surface treatment may be tailored also, for example, by incorporating a colored dye or pigment into the surface treatment. The treatments can be used with a variety of different multilayer dielectric reflectors. For example, increased transmission of light that would otherwise be reflected can be obtained in wideband visible mirrors, narrowband mirrors, reflective polarizers, and the like. Various surface treatments and techniques are described below, by way of example and not of limitation, to facilitate a further understanding of the invention.

Figure 4:
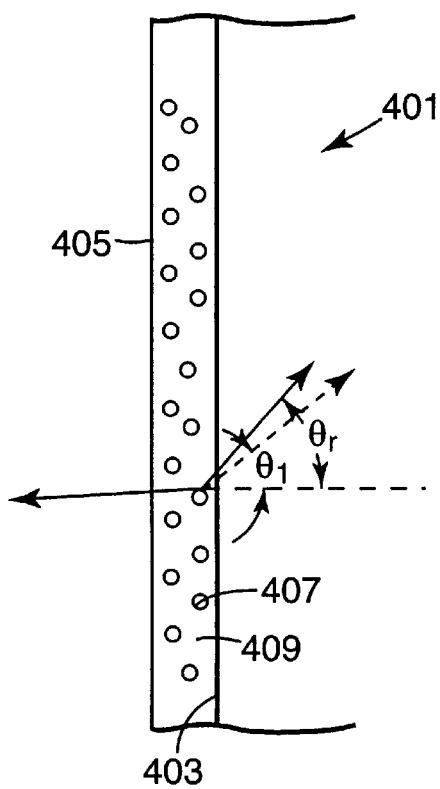
FIG. 4 illustrates a surface treatment in accordance with one embodiment of the present invention.

FIG. 4 illustrates a portion of a multilayer reflector 401 which has a surface 403 treated with a diffusing layer 405. The diffusing layer 405 includes a number of diffusing elements 407 disposed within a binder 409. The diffusing layer 405 scatters light as the light encounters the diffusing elements 407. The diffusing elements 407 and binder 409, as well as loading concentration and thickness, may be selected to provide substantial forward scattering of the light with an angle $\theta_p$ which is larger than the maximum angle $\theta_l$ which is reflected by the multilayer reflector 401. In this manner, as described above, the amount of light that is transmitted through the reflector can be substantially increased. Where the propagation angle $\theta_p$ exceeds the critical angle for TIR at the exit surface, the incident surface and exit surface must both be treated to permit the light to exit the multilayer reflector. The light diffusing layer 405 may be applied to the exit surface to couple high angle light out of the stack.

In general, a large variety of particles embedded in a continuous binder, configured as a layer or film, can be used to control transmission through a dielectric reflector. Such diffusers both transmit and reflect light incident upon them in a diffuse manner. It is generally desirable that the diffusing layer scatter light primarily into the forward hemisphere (transmission), at angles that deviate strongly from the specular transmission angle. It will be appreciated, however, that such a diffuser will also tend to scatter a fraction of the incident light in the backward hemisphere (reflection). The degree to which incident light is forward scattered (transmitted) and backscattered (reflected), and the distribution of angles over which the light is scattered can be controlled. The scattering characteristic of the diffusing layer is generally a function of the refractive index mismatch between the particles and the binder matrix, the characteristic size of the particles relative to the wavelength of light, the volume fraction of the particles in the layer, the thickness of the scattering layer and the shape of the particles.

By controlling the various parameters, the amount of incident light transmitted into high angles can be maximized or otherwise tailored to desired levels. Typically, a particle with an optical thickness near the wavelength of the incident light strongly scatters light if the index mismatch between the particle and the medium is greater than 10%. For example, a binder layer having an index of about 1.5, with particles having an index greater than about 1.65 or less than about 1.35 should provide significant scattering. It is noted that the particle size is generally as large or larger than the size of the optical layers. Thus, the scattering particles are preferably incorporated into separate layers since incorporating the particles into the optical layers may distort them, reducing optical coherence and reflecting power.

In certain optical constructions the particles can be incorporated into a non-optical layer of a multilayer optical reflector. Co-extruded multilayer optical films, for example, often employ relatively thick non-optical skin layers formed on each side of the optical stack. In accordance with one aspect of the invention, scattering particles may be incorporated into one or more of the skin layers. In one such reflector, biaxially oriented PEN with an in-plane index of 1.75 is used as the skin layer, suggesting a particle index of greater than 1.93 or less than 1.58. TiO2 particles, having a relatively large index of about 2.4 could be used. SiO2 particles, with an index of 1.5, should also work well in such skins. The index of the binder for the scattering layer is preferably selected to optimize the desired scattering process and the coupling of light into the multilayer film.

Where the multilayer reflector is polarization dependent, it may also be desirable to control the extent to which the diffusing layer alters the polarization of light. It may be desirable to permit, for example, light polarized in the reflection state of a multilayer reflective polarizer to transmit through selected portions of the reflector. Light transmitted through untreated portions of the polarizing stack will be substantially one polarization (i.e., the stack will substantially reflect the other polarization). By selectively treating the reflective polarizer as described herein, the polarizer may be rendered substantially transmissive to both polarization states of light at the treated locations. In one such embodiment, while both treated and untreated portions appear transmissive, the treated portion will appear more transmissive than the untreated portions. Where the polarization is preserved for at least one polarization, the different characteristics of the treated and untreated regions may be further observed by viewing the film with the aid of polarizers. In one embodiment, this may be used to verify that an indicia bearing substrate is indeed comprised of a multilayer dielectric polarizer. In another embodiment, the polarizer is treated so that it becomes partially transmissive for the polarization state that is normally reflected by the polarizer, with the degree of transmission selected to be on the order of 10 percent or 20 percent, with the transmitted portion retaining its original polarization state. Such articles are useful as transflectors in LCD displays that allow both backlit and ambient-lighted viewing of displayed information. Both scattering and refractive treatments that preserve the polarization state may be applied to the polarizer. Generally, refractive treatments will cause less depolarization than diffuse scattering treatments. Diffusers made with spherical particles in a binder having a small index difference from the index of the particles will minimize the depolarization of light.

As noted above, a number of suitable surface treatments may be used to scatter light into the multilayer stack. The increased transmissive effect has been observed by incorporating slip particles into skin layers of a coextruded multilayer stack during extrusion, applying spray paint to opposing surfaces of a multilayer stack, coating a binder containing particles onto the sides of the stack, adhering diffusing tape to each surface after extrusion, etc. The various treatments can be combined for effect since the same treatment does not need to be applied to each surface. Because enhanced transmission typically requires treatment on opposing surfaces, it is possible to treat one complete surface (e.g., the exit surface) with a diffuser while selectively applying a treatment to the opposite surface (e.g., the incident side). The treatment may also be reversible by removing at least one of the treatments. For example, a reflector that is treated with paint sprayed on both sides may exhibit increased transmission, but upon using solvent to remove either paint coating, the transmission reverts to the levels obtained without the surface treatment.

Figure 5:
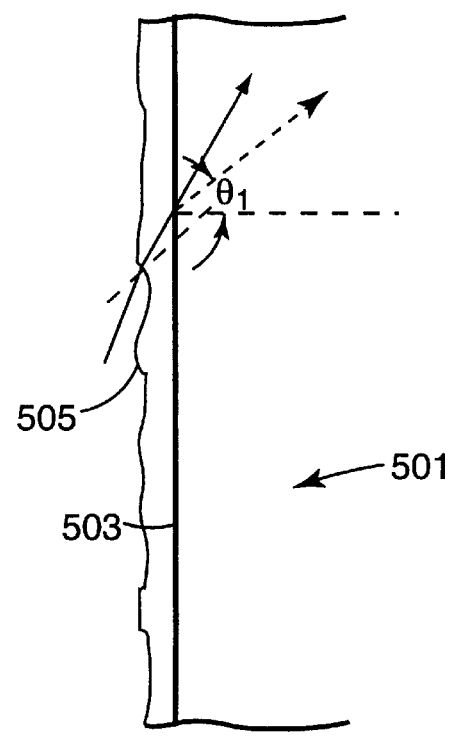
FIG. 5 illustrates a surface treatment in accordance with another embodiment of the present invention.

While the above discussion focuses on bulk-diffusing particles, in another example of the invention enhanced transmission is obtained by treating the light incident surface to form a surface diffuser. FIG. 5 illustrates an embodiment of the invention where the surface 503 of a multilayer stack 501 is treated to form a surface diffuser 505. The principles of increased transmission resulting from surface diffusion are the same as bulk diffusers. The texture of the surface diffuser 505 may be used to couple light with high propagation angles in the stack (i.e., angles that would otherwise reflect into and/or out of the stack). Generally, if the texture of the surface diffuser is substantially larger than the wavelength of light, geometrical optics dictate the propagation angles (i.e., Snell's Law is effective at each interface, but it must operate in the coordinate system normal to the local surface). Alternatively, if the texture of the surface diffuser is on the order of, or smaller than, the wavelength of light, diffractive effects determine the angles of propagation. A variety of known processes can be used to form a surface diffuser on the substrate. For example, the surface may be randomly roughened (e.g., using sandblasting and abrasive materials), pseudo-randomly roughened by embossing, etc., to form localized geometrical variations.

As noted above, scattering of incident light rays by particles embedded in a surface layer or by abrading or texturing the surface layer permits light rays to traverse the multilayer stack at angles larger than the maximum angle reflected by the stack and at angles not allowed by Snell's law for surfaces planar to the optical repeating unit layers. Surface scattering is advantageous in that it provides a high index change (e.g., air to skin index differential). Using a matrix with scattering particles provides significant process handles in thickness, particle size, and concentration. For example, the particles used usually have a finite size distribution. They may be coated so that only a single scattering event is likely or that multiple scattering occurs.

In the above two cases, bulk and surface diffusers were used to direct light into the multilayer stack with generally random propagation angles. As described above and further illustrated in FIG. 6, the amount of light transmitted through a multilayer stack 601 can be more precisely controlled by applying microstructured surfaces 603 and 605 to selected portions of the multilayer stack 601 surfaces 607 and 609. The angle $\theta_s$, in combination with the refractive indices of the material of the microstructured surface 603 and the multilayer stack can be selected to more precisely specify the propagation angles $\theta_p$ of light through the stack. The structured surface may be applied by laminating, with an optical adhesive, a structured film such as 3M brand Optical Lighting Film (OLF), Front Extraction Tape (each available from the 3M Company), etc., to the multilayer stack, or may be incorporated directly onto (e.g., by embossing) the outer protective layers of the stack.

Figure 6:
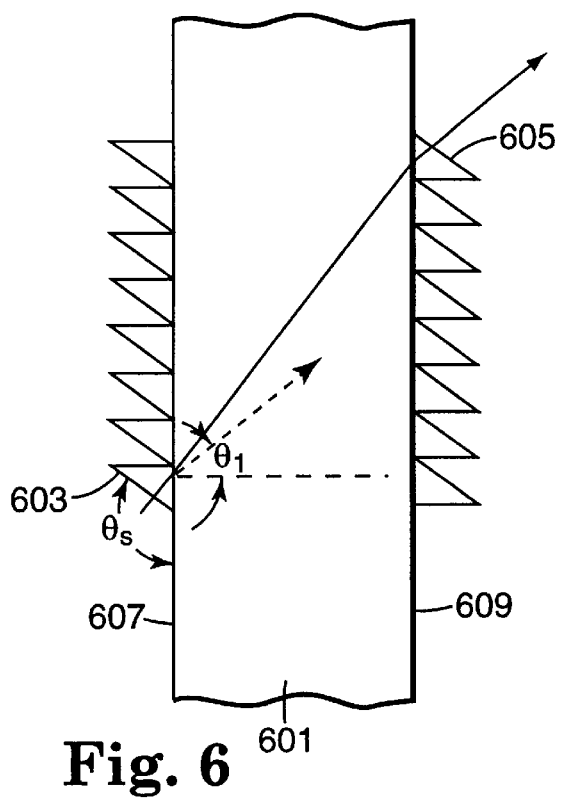
FIG. 6 illustrates a surface treatment in accordance with still another embodiment of the present invention.

The index of the structured material is selected to couple light effectively into the optical layers at high angles of incidence. While FIG. 6 illustrates a structured surface applied to both the incident and exit surface of the multilayer stack, it will be appreciated that various treatments can be combined. Front Extraction Tape, for example, can be used with both scattering treatment and geometrical treatment to get high angle rays out of the dielectric stack. This tape has trapezoidal grooves of air that act to extract high angle rays from a surface where they would otherwise undergo total internal reflection.

Figure 7:
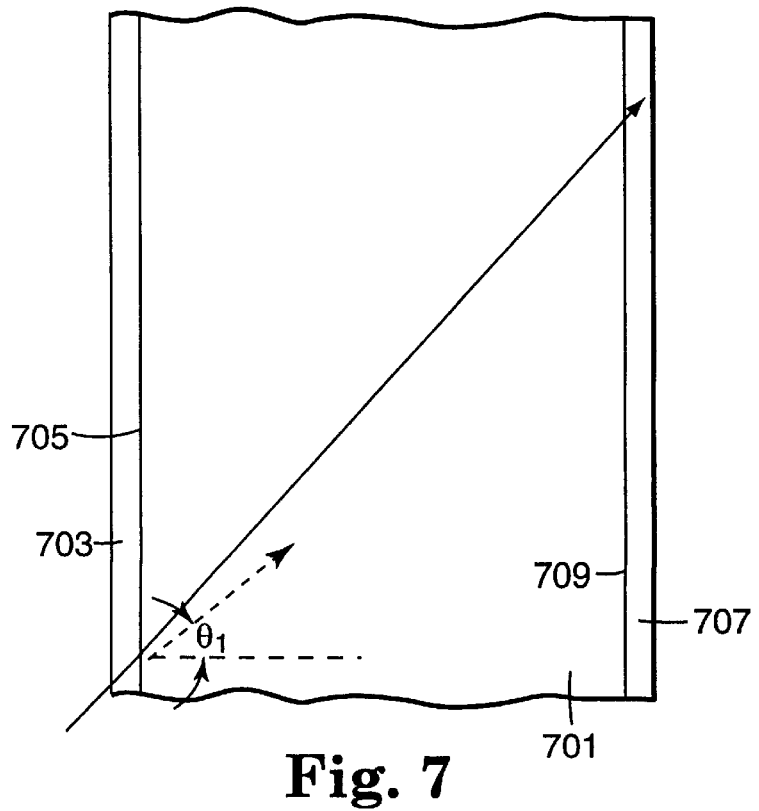
FIG. 7 illustrates another embodiment of the present invention.
Figure 8:
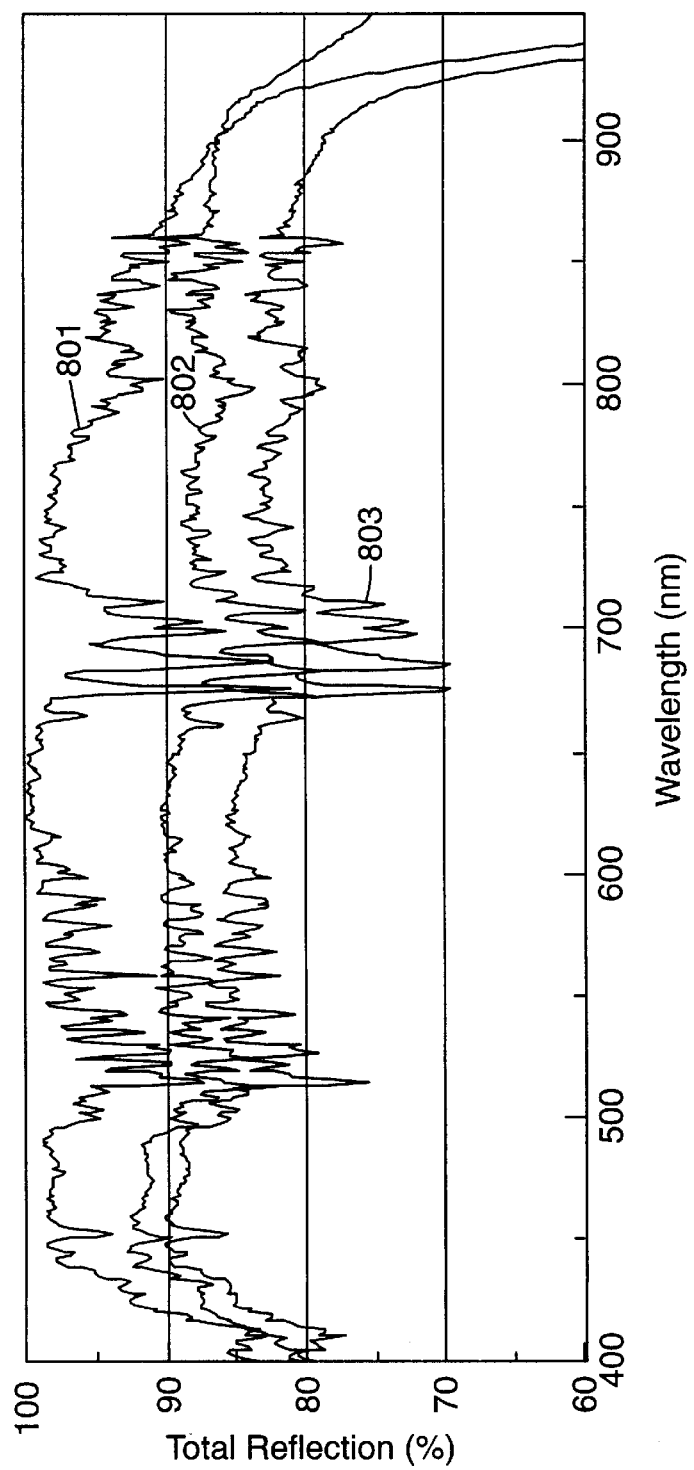
FIG. 8 illustrates the reflection spectrum for a reflector according to one embodiment of the invention.

While the above description is directed primarily to the selective treatment of a multilayer reflector to increase transmission, it will be appreciated that similar treatments also may be used to selectively decrease reflectivity of the reflector. As illustrated in FIG. 7, the reflectivity of a multilayer stack 701 can be decreased by using a scattering treatment 703 on the incident surface 705 and an absorber 707 on the back surface 709. In general, any of the incident side treatments described herein can be used to increase transmission through the multilayer stack 701. Once the propagation angle is increased, any backside treatment that either couples the light out of the film as described herein, or absorbs the light that would otherwise TIR from the back of the film, will reduce the overall reflection by the stack. Thus, where a treatment is applied to the incident surface of a highly reflective dielectric mirror (>99% reflection), for example, even laminating a material as reflective as aluminum can reduce the overall reflectivity. This phenomenon is illustrated in FIG. 8. Colored absorbers thus applied to the exit side of the film will reduce the reflectivity of the film only for the colors of light which they absorb, imparting the complimentary color to the light reflected from the composite structure.

In FIG. 8, the incident side of a multilayer mirror constructed of alternating layers of biaxially oriented PEN (ordinary or in-plane of index 1.75, extraordinary or z-index of 1.49) and PMMA (index 1.49) was treated with a coating of $TiO_2$ beads (index 2.4) dispersed within a binder of thickness of 5 microns and index 1.48. The bead loading was 5% by volume of the binder. Curve 801 represents the total reflectance (%) of light incident on the front side treated multilayer mirror with no backside coating. Curve 802 represents the multilayer mirror optically coupled to aluminum having a refractive index of 1.5. Curve 803 represents the total reflectance for the multilayer mirror with black ink coating on the backside. The curves represent the reflectance for light of normal incidence. In accordance with one embodiment of the invention, a reflector having regions of high and low reflectivity is provided by applying a black absorber to the backside of the reflector and by selectively treating the incident side surface to increase the amount of light that transmits through the reflector and is absorbed by the backside treatment.

Figure 9:
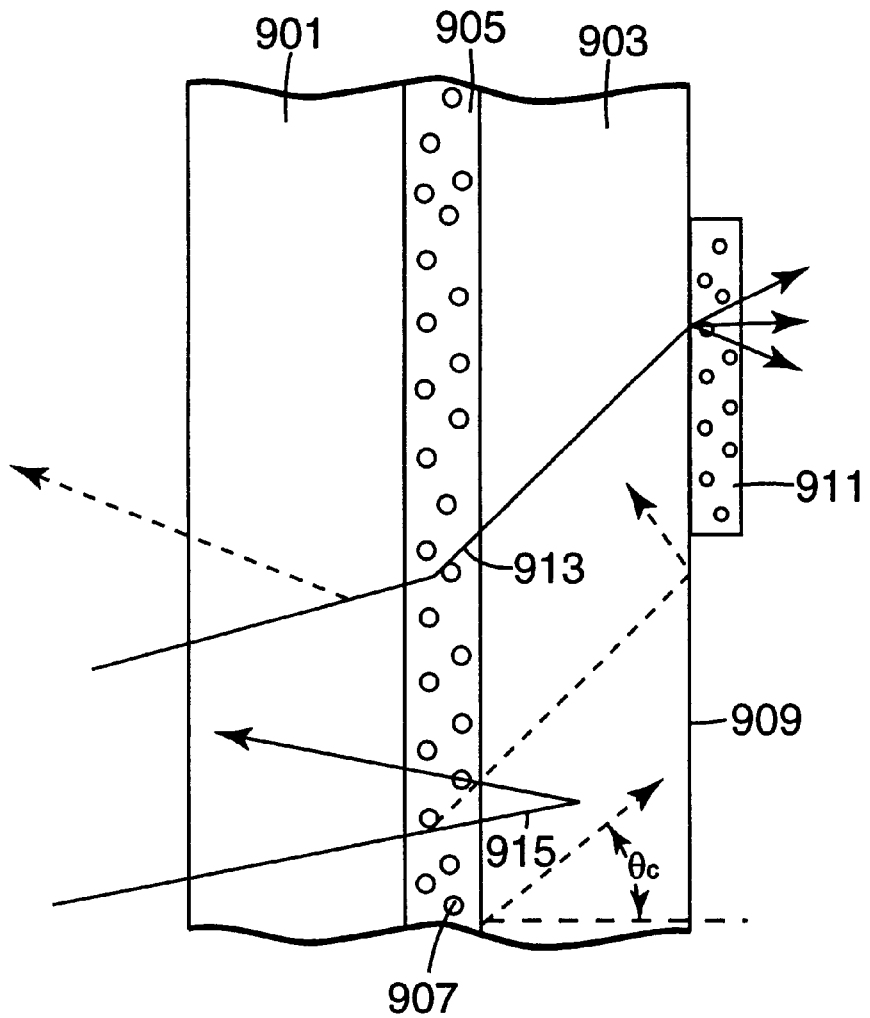
FIG. 9 illustrates still another embodiment of the present invention.

In some of the various exemplary embodiments described above, the surfaces of the multilayer reflector formed an interface with air. It should be appreciated, however, that in other instances the interface at the surface (treated or untreated surface) could be surrounded by a material having an index other than air (i.e., n>1.00). FIG. 9 illustrates another embodiment of the present invention that serves to demonstrate this and other aspects of the invention. In FIG. 9, two multilayer stacks 901 and 903 are shown. The multilayer stacks are separated by a boundary layer 905. The boundary layer 905 and the two multilayer stacks 901 and 903 form a unitary structure. The boundary layer 905 is formed of a generally transparent binder material with scattering particles 907 dispersed therein. The boundary layer 905 with the embedded scattering particles 907 serves as a treated surface for the multilayer stack 903. A portion of the exit surface 911 of the second multilayer stack 903 is treated (in the illustrated example with a diffuser) to permit light propagating through the second multilayer stack 903 at an angle above the critical angle $\theta_c$ for TIR to exit the second multilayer stack 903.

In the embodiment of FIG. 9, the optical properties of the first and second multilayer stacks can be designed to obtain different transmission effects. For example, the first multilayer stack 901 may be designed to reflect all but a selected wavelength band (e.g., a particular color). Light 913 and 915 at the selected wavelength band transmits through the first multilayer stack 901 into the boundary layer 905. At least a portion of this light 913 is scattered into the second multilayer stack 903 at an angle greater than the angle $\theta_c$ permitted by Snell's law at the planar surface of the first dielectric stack. If the second multilayer stack 903 is a broadband mirror, the second multilayer stack will typically reflect light of all wavelengths propagating below the critical angle. Where the exit surface 909 of the second multilayer stack is untreated, light propagating at an angle above $\theta_c$ will under go TIR at the rear surface. The treated portions of the exit surface 909 couples at least a portion of the light propagating with a high angle in the multilayer stack out of the stack. Because the spectral characteristic of the light entering the second stack is constrained by the first multilayer stack, the light exiting at the selectively treated portions of the second multilayer stack has a particular spectral characteristic.

In an alternative embodiment of FIG. 9, the light can be incident from the right onto treated multilayer mirror 903 and multilayer stack 901 can be a reflective polarizer such as DBEF available from 3M Company. In this manner, the combined article transmits only light of one polarization direction. Furthermore, due to the recycling properties of DBEF in combination with a diffuse light source, more than 50 percent of the incident light can be transmitted in one polarization.

As the above examples illustrate, a multilayer reflector can be selectively treated in a number of ways to alter its transmission and reflection characteristics. Moreover, the treatments are typically quite flexible and inexpensive. Many of the treatments can be applied without special equipment. This facilitates treatment of the surfaces at the eventual site where the reflector will be used. In one embodiment, the invention is particularly suitable for applications requiring a tailored reduction in reflectivity and/or increase in transmission over a defined area. In many treatments the altered transmission/reflection effect can be temporarily applied to different multilayer dielectric reflectors. For example, soluble coatings and layers that do not require permanent bonding may be used and subsequently removed.

Figure 10:
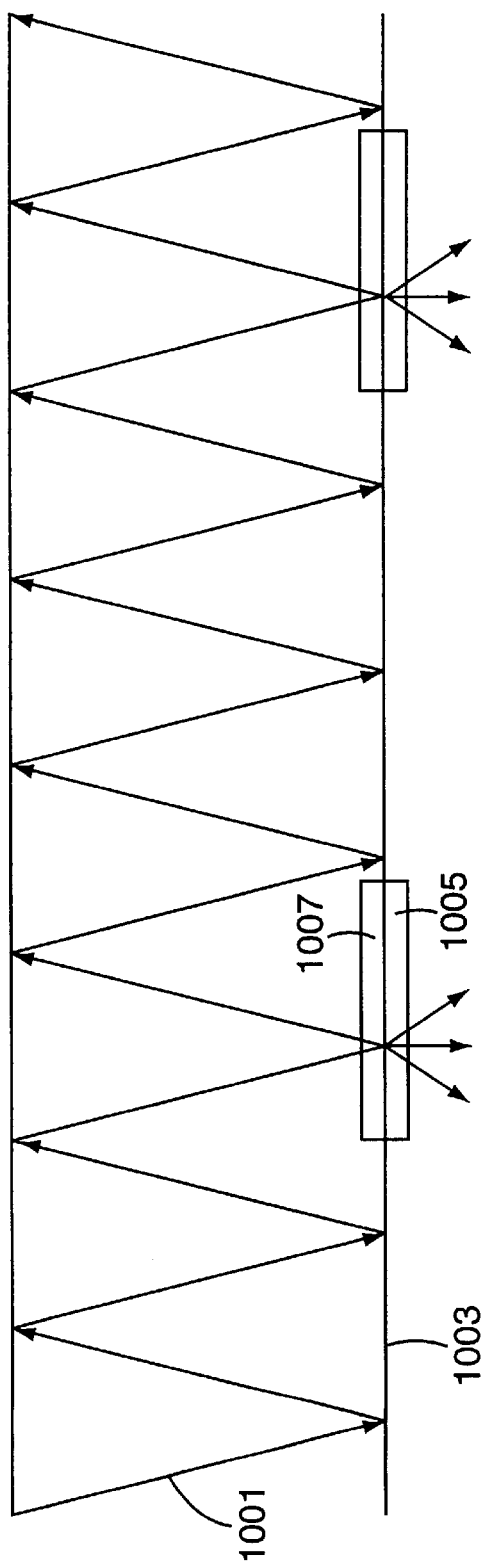
FIG. 10 illustrates yet another embodiment of the invention.

As will be appreciated, the present invention is suited for use in a variety of different applications. A number of such applications are described below. In one application, selectively applied treatments can be applied to opposing surfaces of a hollow light guide to extract light from the light guide. FIG. 10 demonstrates the application of various aspects of the present invention to such light guides. In FIG. 10, a light source (not shown) directs light 1001 into a hollow light guide 1003. The light guide 1003 may be constructed of a highly efficient (e.g., >99% reflective) dielectric multilayer mirror such as the described in the above referenced published PCT Patent Application WO 95/17303. The light 1001 propagates through the light guide 1003 with very little loss. Such light guides can be used to transport light over relatively large distances. One particular advantage of the present invention is that relatively simple treatments 1005 and 1007 may be applied to opposing sides of the light guide 1003 to extract light at desired locations. The applied treatments may be any of the above treatments described herein or a combination thereof.

While in FIG. 10, the treatments are shown as being applied on both surfaces at the particular location where light is to be extracted, as noted above, one complete surface may be treated while selectively applying the treatment to the other surface at those locations where it is desired to extract light. Where a diffusing treatment is used, it may be preferable to apply the selective treatment to the inside of the light guide to minimize reduction in light transport efficiency of the light guide. Alternatively, a highly efficient diffuse reflector may be applied to the inner surface. One such highly efficient diffuse reflector is described in U.S. patent application Ser. No. 08/957,558 entitled Diffuse Reflective Article, the contents of which are incorporated herein by reference. Structured surfaces could also be used to extract light from a light guide. For example, 3M brand Optical Lighting Film OLF may be adhered to one or both sides of a multilayer reflector to couple light into or out of the selected areas. Where a structured surface material is used on the exit side, a diffuser may also be used to make the extracted light more visible due to the directional nature of the light escaping from the light guide.

The shape of the light guide illustrated in FIG. 10 may vary depending on the particular use of the light guide. For example, a cylindrical light guide may be used to primarily transport light. A wedge light guide may also be used. In another example, illustrated in FIG. 11, a box construction is used as a lightbox 1100 to create a light sign. The lightbox 1100 may be constructed of a standard lightbox lined with a highly reflective multilayer reflector (e.g., a polymeric multilayer visible mirror). The multilayer reflector is also used to cover the front surface of the lightbox. Where both sides of the reflector are treated (e.g., with diffuse coatings), the reflector becomes relatively transmissive. The treatment could be accomplished, for example, by completely covering one side of the reflector with a flat white latex paint and by stenciled lettering on the reverse side. The diffuse coating and stencil letter could be applied to either side.

Figure 11:
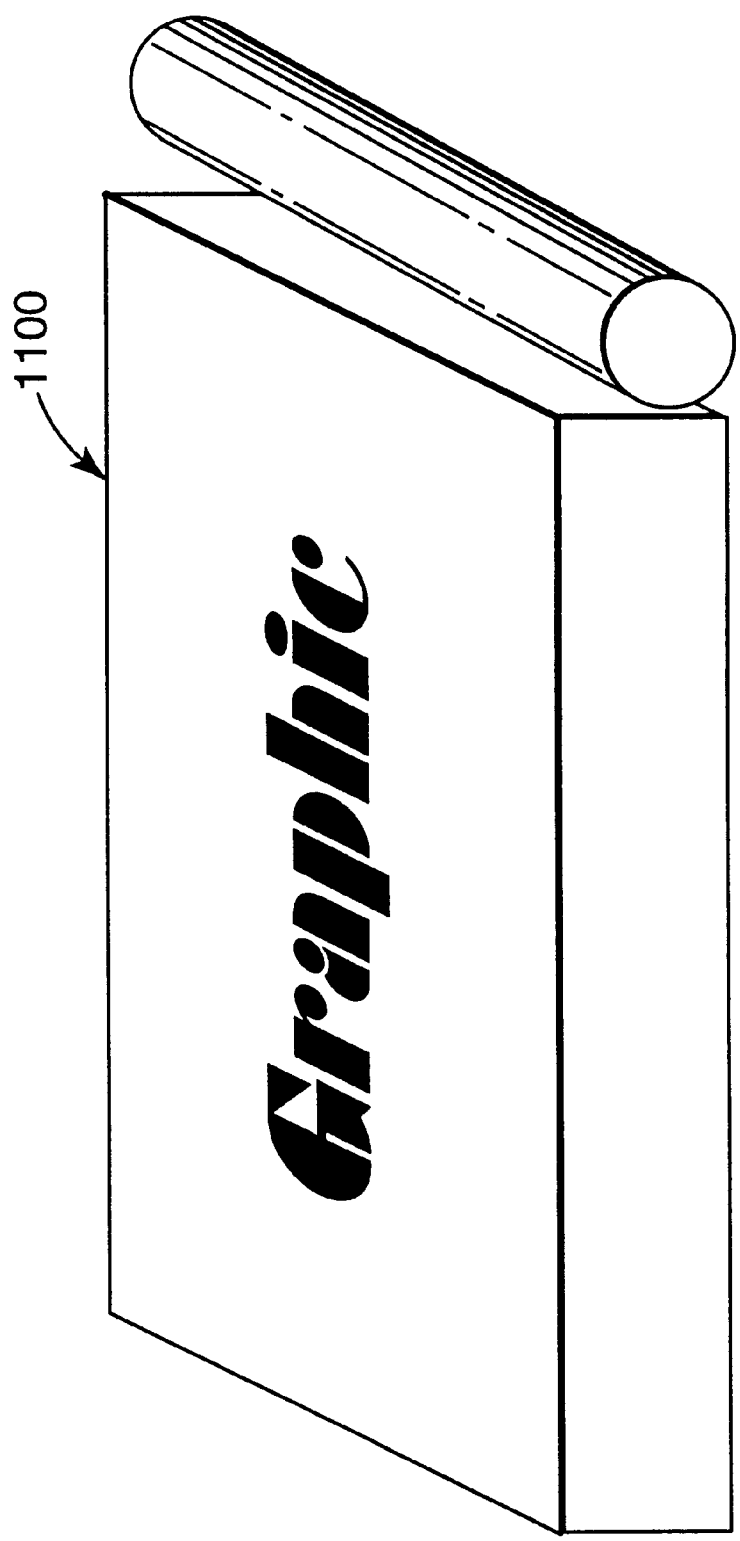
FIG. 11 illustrates still another embodiment of the present invention.

It is noted that the lightbox 1100 of FIG. 11 is illuminated from one end of the lightbox. Because some of the lettering is closer to the light source, the lettering tends to have non-uniform illumination properties under uniform extraction conditions. However, the treatment used to extract light through the multilayer reflector can be varied to obtain a more uniformly lit sign. In one embodiment, a gradient of treatment is used to vary the amount of light coupled into or out of the reflector at high angles (and hence transmitted through the reflector). By increasing the coupling efficiency as the treatment gets farther away from the light source, a more uniform light output across the face of the sign can be achieved. This can be accomplished, for example, by applying the stenciled lettering to one surface of the multilayer reflector and by applying a gradient of treatment (e.g., varying levels of paint) to the other surface. The extent of treatment may be from a relatively low level near the light source to a relatively high level at the far side of the fixture.

A gradient or other varied treatment level can also be used in other applications where it is desirable to control the relative amount of light transmitted through a multilayer reflector. This effect could be used to more precisely control reflectivity or transmission over selected areas of the dielectric reflector. This could be accomplished by printing the surface with a scattering pigment or ink, abrasion by roughening or sandblasting of each surface, lamination of a second layer to selected areas of the surface, and the like. Where the entire surface is to be treated, the treatment may include diffusing particles in the skin layers of a coextruded multilayer stack during extrusion, by using immiscible polymer blends in skin layers, by coating the surface with appropriate inks, and the like. As noted above, one side of the dielectric reflector can be treated over the entire surface and the second side can be treated in selected areas, eliminating the problem of registering similar patterns on both sides. In such an embodiment, it becomes important that the side that is only partially treated be kept clean and scratch-free in those areas where no transmission increase is desired. In certain cases it may be desirable to laminate the reflector to glass or other scratch resistant material to increase the durability and ease of cleaning of exposed surfaces. A clear, scratch resistant coating could also be applied.

A variety of other surface treatments may be used to direct the light incident on the mirror to angles beyond the critical angle within the stack or skin layers on the stack. One general class of such treatments is diffraction gratings that can be impressed into the surface layers of the mirror by methods known in the art. Partial metallization as for blazed gratings can be utilized. Surface holograms can also be utilized. These can be applied as separate sheets laminated to the mirror film, or the surface holograms may be embossed directly into the skin or other pre-existing coating on the mirror film. Surface holograms can also be over coated or "buried", as long as the material covering them has a measurably different index of refraction.

The skin layer or other additionally applied layers to the mirror can also contain volumetric regions of material having a modulated index of refraction such as volume holograms or even small pieces of multilayer optical stacks dispersed in a clear binder layer. Such pieces can be of either inorganic or polymeric multilayer stacks, or both. These dispersed pieces could be contained in a surface layer that has a planar air interface, or in surface layers that have a locally non-planar air interface. The latter case would thus be utilizing both a lensing means and an internal light redirecting means to effect the redirection of incident light to angles beyond the critical angle of the mirror body.

In addition to index modulated regions in a surface layer, common metal mirror flakes could also be utilized to redirect the incoming light. Such flakes could be freestanding (before immersion), or could be metal vapor coated flakes of nonmetallic materials. Active treatments could be generated, for example, by switching the degree of scattering in a layer coupled to the dielectric film. By combining a polymer dispersed liquid crystal (PDLC) coating with appropriate electrodes, such as 3M Privacy Film, the transmission of a multilayer stack can be electronically controlled. For example, a complete PDLC film could be laminated to the reflector, or a reflector could be coated with a transparent conductor and used as one of the PDLC electrodes. Another method to actively alter the transmission is to change the coupling between the treatment and the dielectric mirror. A self-adhering scattering film could be either mechanically or electrostatically coupled and uncoupled to the mirror to generate controllable transmission. These techniques could be useful in distributed lighting via light pipes or in advertising displays and signs to turn the effect on and off.

EXAMPLE 1

Figure 12:
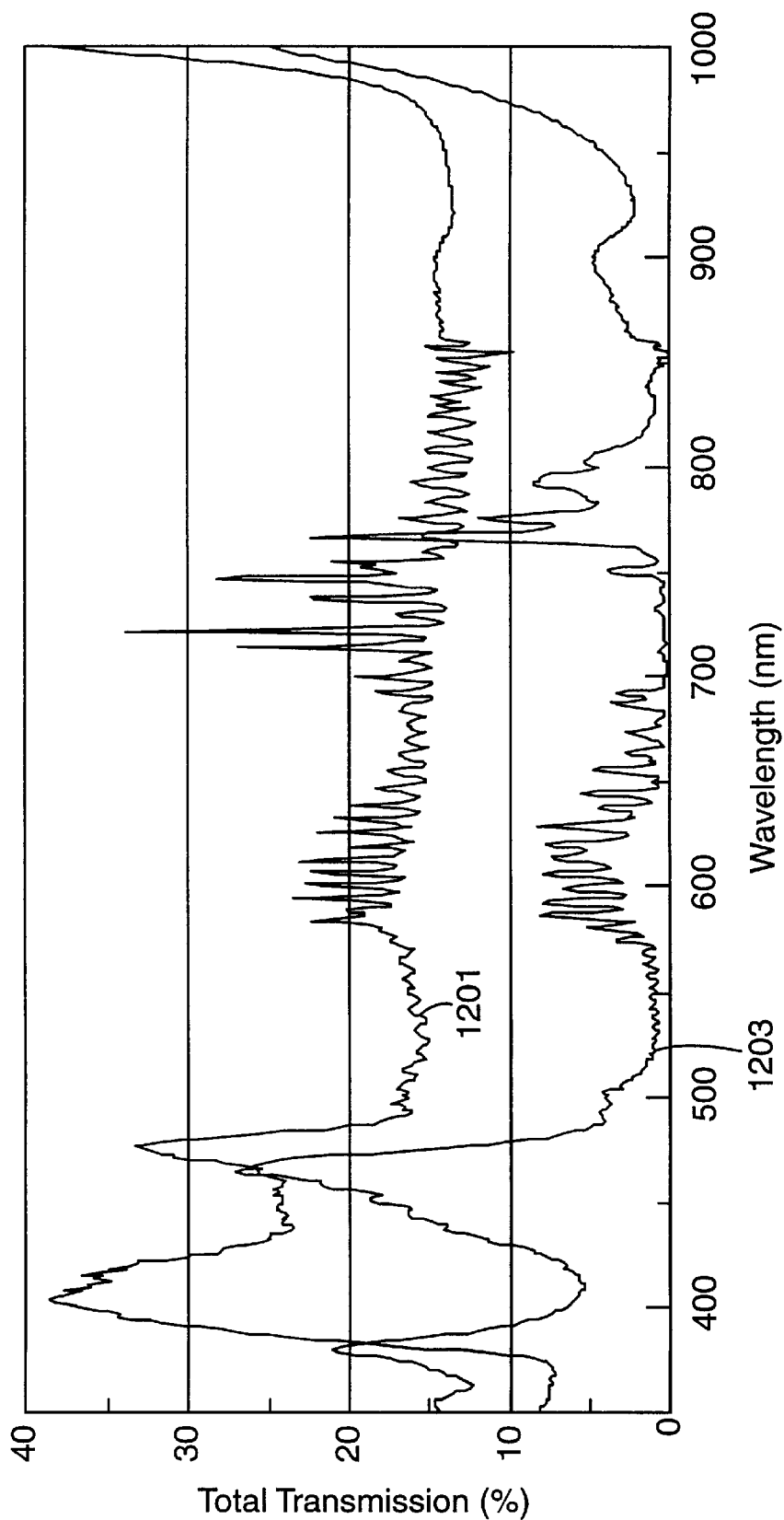
FIG. 12 illustrates the transmission spectrum of a multilayer reflector manufactured in accordance with one embodiment of the invention.

FIG. 12 illustrates the transmission spectrum of a coextruded multilayer reflective mirror incorporating alternating layers of biaxially oriented PEN and PMMA. The reflective mirror was generally constructed of an optical stack designed to substantially reflect visible light diffusely incident on the surface of the mirror (i.e., to substantially reflect visible light propagating through the mirror at angles up to the maximum propagation angle permitted by Snell's law at a planar surface of the mirror). The skin layers of the mirror film had titania ($TiO_2$) particles dispersed therein to effectively couple light into the dielectric stack at an angle transmissive to the stack. The transmission spectrum 1201 of the film with diffusive skin layers is depicted in FIG. 12. Following measurement, one skin layer of the film was stripped away. The resulting transmission spectrum 1203 is also depicted in FIG. 12. As will be appreciated from FIG. 12, the film treated on both surfaces exhibited substantially higher transmission. The transmission spectrum of the film with only one side treated was substantially the same regardless whether the light was incident on the treated or untreated side of the film.

As noted above, various different particles are suitable as scattering elements. Hydrated aluminasilicate ($Al_2O_3*2SiO_2*2H_2O$) particles were tried, for example, with similar results. Generally, higher index particles showed the greatest overall increase in transmission. It is also noted, as illustrated in FIG. 12, that increased transmission through a dielectric reflector may be obtained while maintaining the fine spectral characteristics of the reflector. In this case, the increased transmission is a function of shifting the baseline without substantially altering other characteristics of the reflector.

EXAMPLE 2

Figure 13:
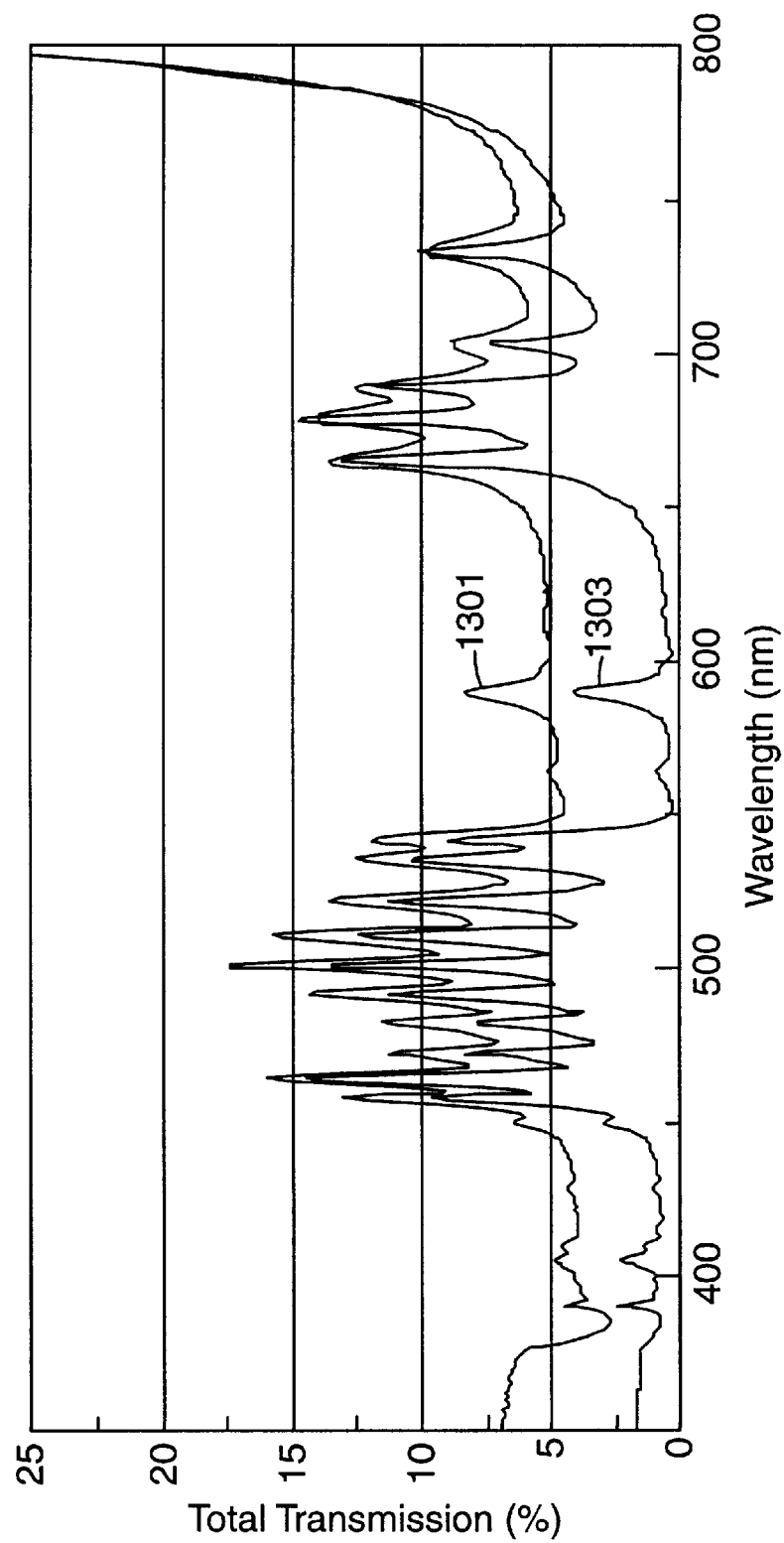
FIG. 13 illustrates the transmission spectrum of multilayer reflectors manufactured in accordance with another embodiment of the invention.

FIG. 13 illustrates increased transmission effects through another dielectric reflector constructed of a broadband optical stack of the type described above in connection with Example 1 (without scattering particles in the skin layers). In this example, adhesive tape (3M Magic Mending Tape) was used to treat opposing surfaces of the dielectric reflector to couple light, having high propagation angles in the dielectric stack, into and out of the skin layers. The transmission spectrum is illustrated as curve 1301. For comparison, the spectrum 1303 for the film having only one side treated is also illustrated. As will be appreciated in FIG. 13, treating each side of the multilayer reflector in this manner increased the average transmission level in the band without significantly changing the spectral features of the transmission curve. While the amount of increased transmission is relatively small, an observable contrast between treated and untreated portions of the reflector was evident. Other self-adhering scattering tapes, such as 3M ScotchCal Marking Film, which incorporates $TiO_2$ particles in an adhesive binder, produced a larger increase in transmission.

EXAMPLE 3

Figure 14:
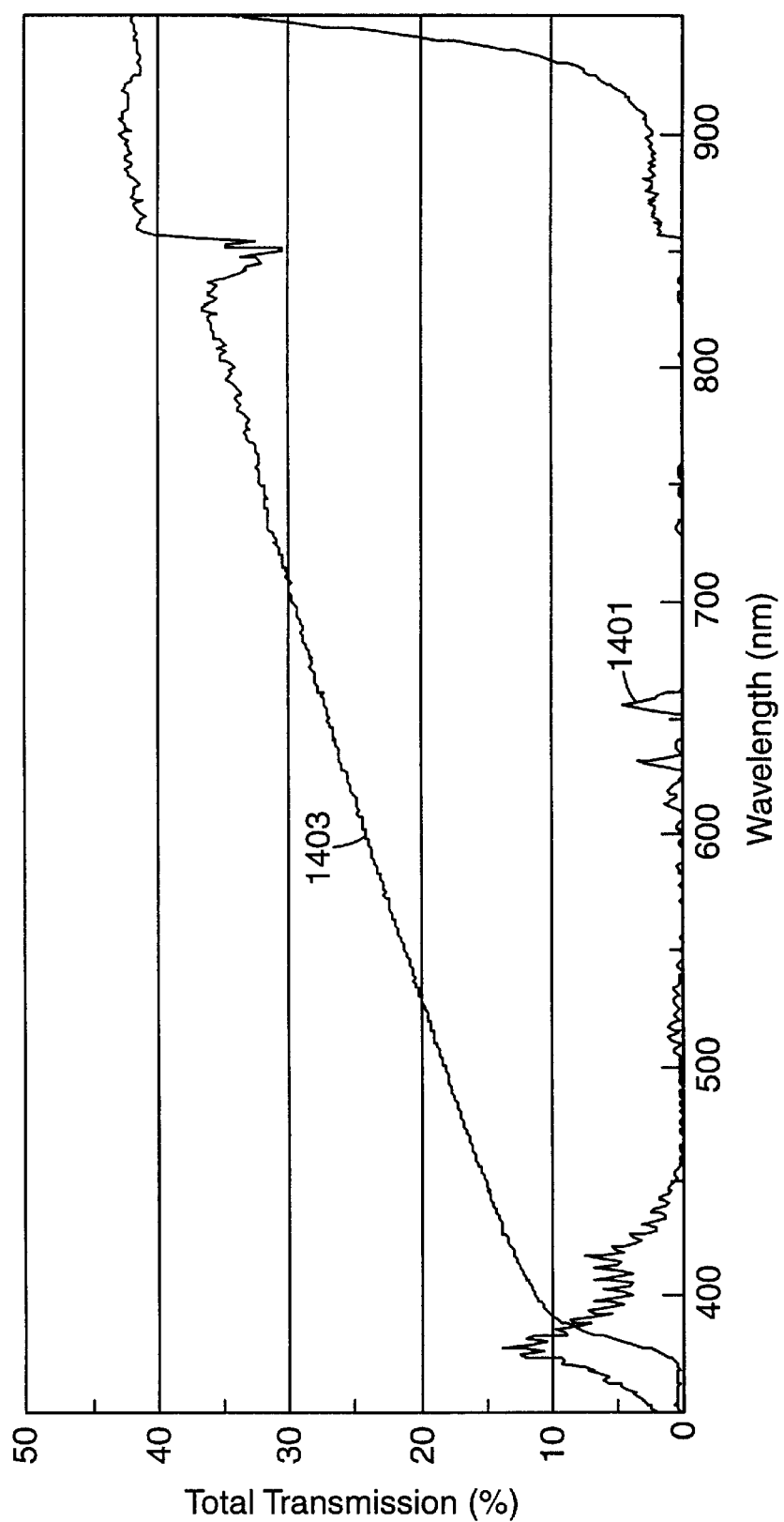
FIG. 14 illustrates the transmission spectrum of still another multilayer reflector in accordance with an embodiment of the invention.

FIG. 14 illustrates the increased transmission effect where both sides of a broadband dielectric reflector of the type described above were treated with Plasti-kote Water Based Enamel 525 White Silk spray paint. FIG. 14 illustrates the transmission spectrum for the multilayer reflector before 1401 and after 1403 the surfaces were treated. The resulting total transmission curve 1403 for the treated film was as high as 30% in the near IR, below the bandedge of the film. The increased transmission exhibited wavelength dependence, leading to a yellow tint. Due to the pigment used in the paint, there is significant reflectivity in the near IR, beyond the effective band of the multilayer. The peak between 850 nm and 900 nm is an artifact of the measurement process and is not related to the treatment of the film.

EXAMPLE 4

Figure 15:
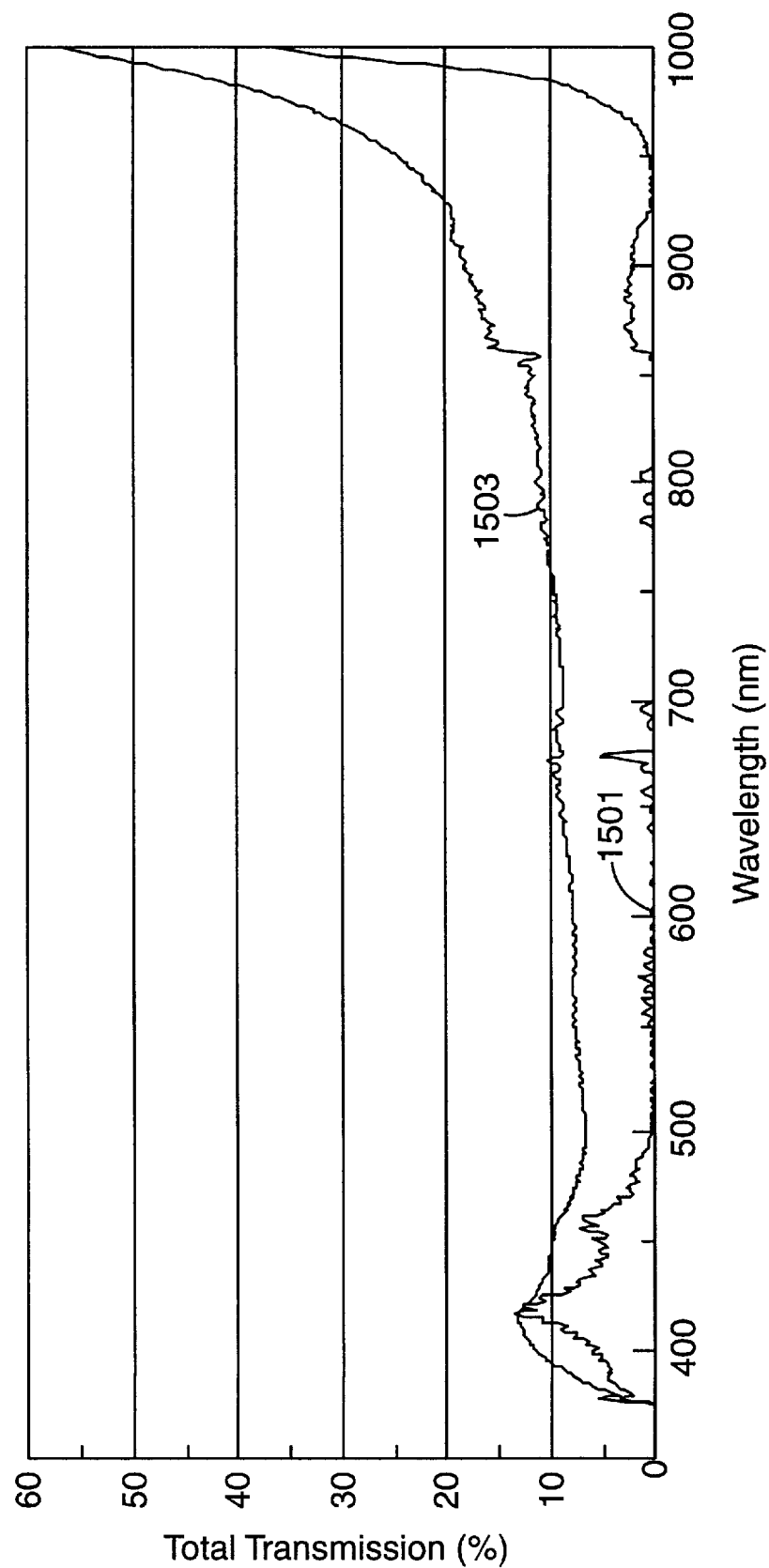
FIG. 15 illustrates the transmission spectrum of multilayer reflectors manufactured in accordance with still another embodiment of the invention.

The transmission spectrum illustrated in FIG. 15 depicts the transmission of a broadband multilayer reflector without treatment 1501 and with both sides treated 1503 by abrading the surface with sandpaper to produce a scattering surface. The abrasive treatment was applied to the skin layers of the film to prevent disruption of the optical layers. The abrasion of the front surface decreases the sharpness of the bandedge. The transmission level throughout the visible increases by about 8%. A similar change in bandedge was also noted in a film treated on the incident side only. A substantial increase in transmission in the visible spectrum with only one surface treated, however, was not observed. The level of bandedge shift due to the front surface abrasion would indicate significant amount of light was scattered to propagation angles of at least 60°.

EXAMPLE 5

Figure 16:
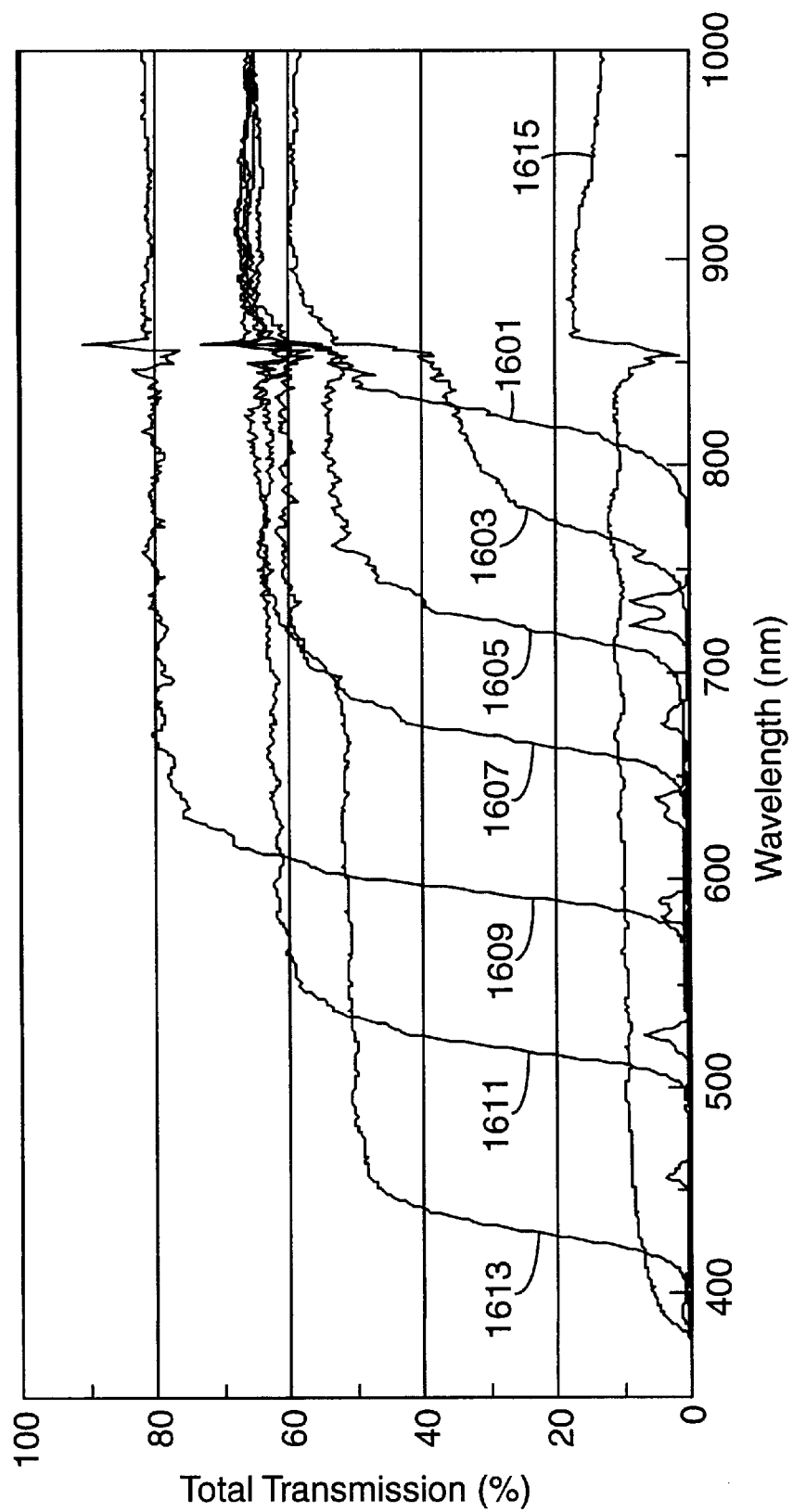
FIG. 16 illustrates the transmission spectrum of multilayer reflectors with various surface treatments in accordance with yet another embodiment of the invention.

In the preceding example, generally random structures were introduced by abrading the surface. Example 5 demonstrates the increased transmission effect that can be obtained by treating the surface with an ordered structure. FIG. 16 illustrates the transmission spectra obtained with collimated light when structured surfaces are applied to the surfaces of a broadband multilayer stack. The multilayer stack is comprised of alternating layers of PEN and PMMA with the angle between the incident light beam and the plane of the multilayer stack being varied. The structured surface films were laminated to the opposing surfaces of the multilayer reflector using an optical adhesive. Various structured surfaces were tried including 3M brand Optical Lighting Film (OLF), cast from polycarbonate resin with an index of 1.586 and with a prism (surface) angle of 45 degrees to the back plane of the film. The multiple right isosceles triangular prisms on the surface of this film are contiguous, with each prism being approximately 0.36 mm wide, 0.18 mm high and running the length of the film.

Other structured plastic films were evaluated for enhancing light transmission also, including "V" beveled glass films. The beveled glass films are typically applied to the perimeters of windowpanes and are designed to give a flat glass pane the appearance of edge beveled glass. The beveled glass film had a variety of pitches at different areas of the film. The highest level of increased transmission was observed for 3M OLF treated surfaces. It is noted that the greatest increase in transmission was observed when the prism structures on opposing surfaces were aligned parallel to one another.

In FIG. 16, the transmission spectrum is illustrated for a multilayer reflector having no treatment, 1601, and for OLF treated surfaces, with the multilayer stack surface oriented at various angles to an incident collimated beam in a spectrophotometer. The plane of incidence was perpendicular to the length direction of the OLF prisms such that at 45° angle of incidence, the light was normally incident on the OLF prism facets. The spectra are for p-polarized light. Spectrum 1603 is for a 10° angle of incidence, 20° 1605, 30° 1607, 40° 1609, 50° 1611, 60° 1613 and 70° 1615. For the untreated film, the maximum angle in the multilayer stack, measured from the normal, is 42.1° in the PMMA layer of index 1.49. S-polarized light traverses the PEN layers at an angle of about 35°, assuming the in-plane indices are about 1.75, while p-polarized light propagates at a slightly larger angle because the index in the direction normal to the film plane is only about 1.5.

On the film treated with OLF, for angles of incidence beyond 45° (i.e. beyond normal to the prism facets) the prisms begin to shadow one another, with only the tips of the prisms catching the beam. Once inside the prisms at these higher angles, the light may TIR off the opposing prism facet and is redirected at a different angle to the multilayer stack. Thus it is difficult to direct all of the light into a multilayer stack at extremely high angles except with specialized optical arrangements. The higher the index of the coupling prism, the higher the angle in the stack layers. To obtain high transmission through a multilayer mirror with the present invention, it is preferable to utilize the highest index prisms available.

To prevent reflection from the opposing surfaces of the prisms, a single large prism may be utilized and all of the light injected near the base of the prism. This arrangement may be feasible only in certain applications. For a single right isosceles triangular prism of index 1.586 with the hypotenuse laminated to the film stack, the light may be injected into the prism with a maximum angle of 71.47° (measured from the normal to the stack layers). Snell's law gives a maximum angle of propagation in the PEN layers (index 1.75) of 59.240° for s-polarized light but an imaginary angle in the PMMA indicating that such light will TIR upon encountering a PMMA layer. However, as described above, certain multilayer stack designs can still transmit substantial quantities of light even though the angle of incidence is greater than the TIR angle for some of the layers. If a PMMA layer in the present example is more than several wavelengths thick, then all of the light will undergo TIR at that layer boundary.

Microstructure shapes other than right isosceles triangles, such as the general shape shown in FIG. 6 can be designed with the proper angles to inject substantially all of a collimated beam of light into the stack at high angles. Because all of the textured films utilized as surface treatments directed the light at substantially larger angles than that of flat film, a strongly enhanced transmission would be expected.

The spectra illustrated in FIG. 16 are for p polarized light. Transmission levels in the visible of 40% to 60% are seen for angles of 60°. The untreated reflector had a normal incident angle bandedge at 830 nm. In an untreated multilayer mirror, the band would be expected to shift no more than to 650 nm. It can be seen that at 60° incidence the multilayer film treated with OLF has a bandedge at 431 nm. While this particular example utilized prismatic structures having planar facets and sharp peaks, curved structures, prisms having a variety of geometrical shapes, lenslet arrays, and the like, may also be utilized.

Geometrically shaped surface treatments need not be restricted to microstructures. For example, in the case of free-standing films or films having a supporting substrate, it may be useful to optically couple individual transparent objects, e.g., prisms, to both sides of a film. The individual objects may be in registration, partially overlapping or not overlapping at all on opposing surfaces of the film. Light can be transported laterally from one treated portion of the surface to a non-overlapping treated portion of the opposing surface via multiple internal reflections due to TIR at the intervening untreated portions of the film.

EXAMPLE 6

Figure 17:
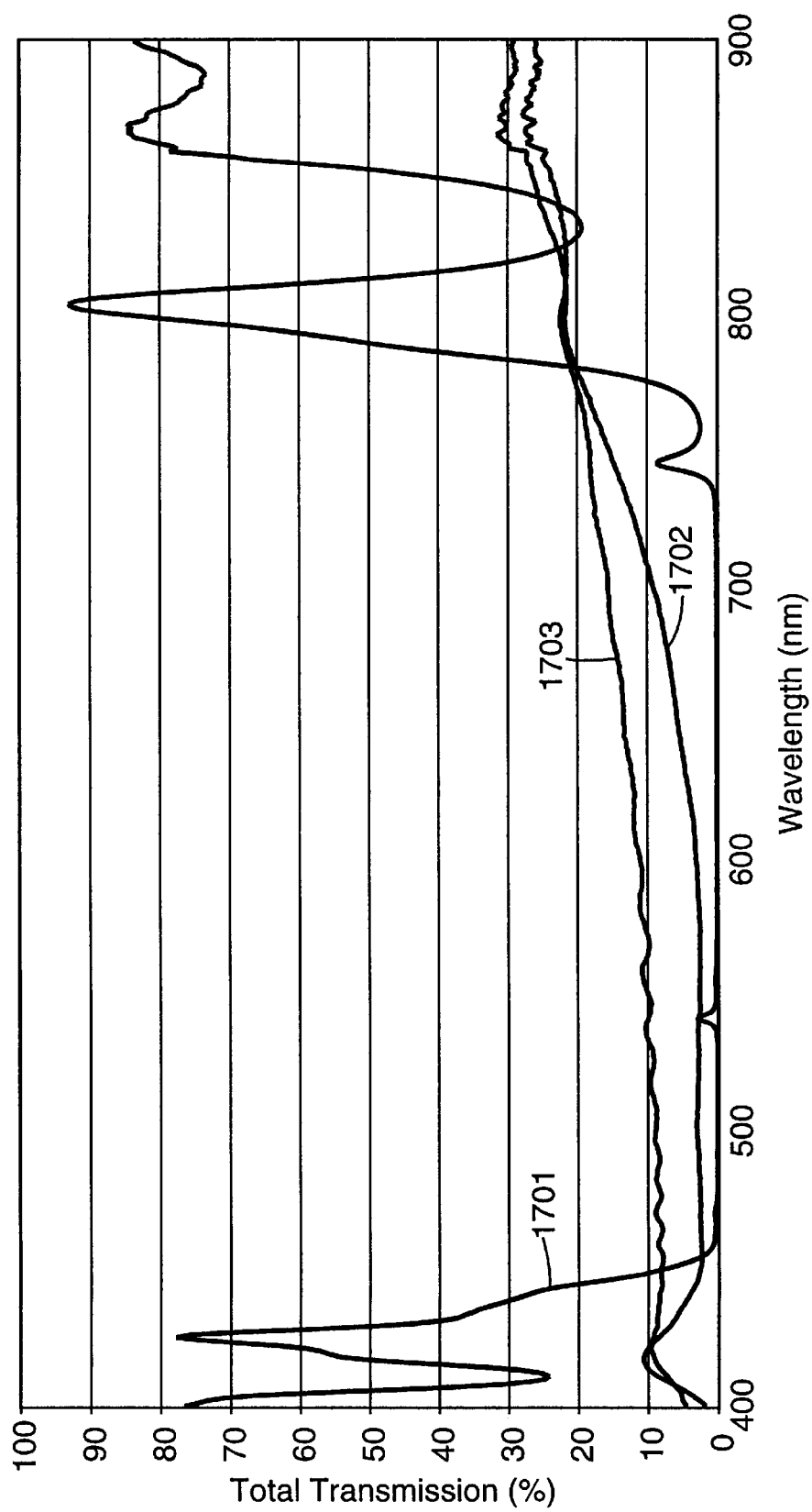
FIG. 17 illustrates the transmission spectrum of another multilayer reflector treated in accordance with an embodiment of the invention.

FIG. 17 illustrates the transmission spectrum of a standard vacuum-coated dielectric reflector (Melles-Griot Maxbrite/001). The dielectric reflector was coated on a glass substrate approximately 5 mm thick. The transmission spectrum demonstrates the reflector without any surface treatment 1701, with one side 1702 and both sides 1703 treated with a scattering paint. One surface treatment was applied to the surface of the relatively thick substrate. This resulted in a separation of one treated surface from the dielectric reflector by a distance equal to the thickness of the substrate. As a result of the separation, some of the scattered light was lost from the collection system (e.g., that light scattered at the largest angles). As the spectrum illustrates, the treatment increased the transmission of visible light through the mirror by approximately 10%.

As illustrated in FIG. 17, the bandedge of the untreated dielectric stack edge is at about 800 nm. This band renders some visible light transmissive at angles lower than the critical angle for TIR. Hence, with only one side treated, the spectrum 1702 shows an increased transmission in the red portion of the spectra. This results from the increased coupling of light at high (but below TIR) propagation angles in the dielectric stack. Where a scattering treatment is applied to both surfaces of the isotropic dielectric mirror, the increased transmission is evident throughout the normally (untreated) reflecting part of the spectra.

EXAMPLE 7

Figure 18:
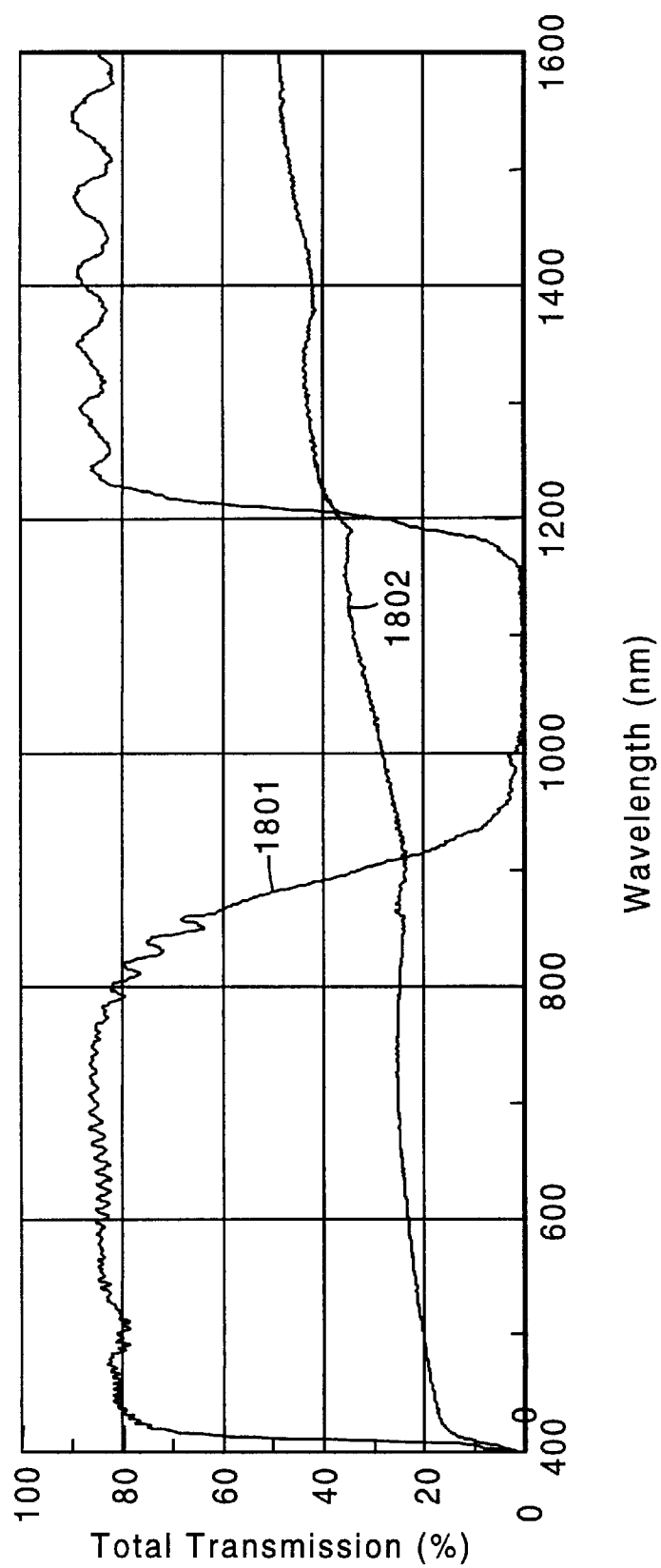
FIG. 18 illustrates the transmission spectrum of another multilayer reflector treated in accordance with an embodiment of the invention.

As noted above, the reflector may be tuned to reflect light at wavelengths other than visible. FIG. 18 illustrates the transmission spectrum for a treated and untreated IR reflective film. The IR reflective film was constructed of an optical stack of 224 layers of PEN and PMMA.

As illustrated by curve 1801 in FIG. 18, the untreated reflector had a reflection band for light between approximately 850 and 1200 nm. When the IR reflector was treated on both sides with diffuser containing $TiO_2$ particles, the transmission in this band was increased by over 20% (curve 1802). Moreover, as will be appreciated from the spectrum, the bandshift was large enough that the entire bandwidth of the reflection band (350 nm) was washed out by the high angle scattering produced by the bulk diffuser.

EXAMPLES 8–12

Examples 8–12 demonstrate the manner in which selective treatment can be used to increase the transmission of light through a reflective polarizer. As noted above, the transmission of multilayer reflective polarizers can be selectively increased just as for multilayer mirrors. In the case of polarizers, the induced transmission of interest is for light having its polarization direction along the reflection (extinction) axis of the film. With polarizers, it is well known that the transmission of light through crossed polarizers may also be induced by any means inserted between the crossed polarizers that depolarizes the light. In contrast, the present invention can be used to selectively control the transmission of light polarized for reflection (extinction) through the polarizer without changing its polarization state. To observe such transmission the effect of any depolarization must be carefully controlled. The induced transmission via wavelength shifting of the reflection spectrum can be observed by using an additional (third) polarizer as an analyzer to determine the amount of polarized light leaking through the reflective polarizer that would otherwise be blocked by the multilayer film. As noted above, like mirrors, polarized light can be selectively transmitted through a multilayer reflective polarizer using a variety of different treatments such as diffuse coatings, geometrically structured surfaces, and the like.

Figure 19:
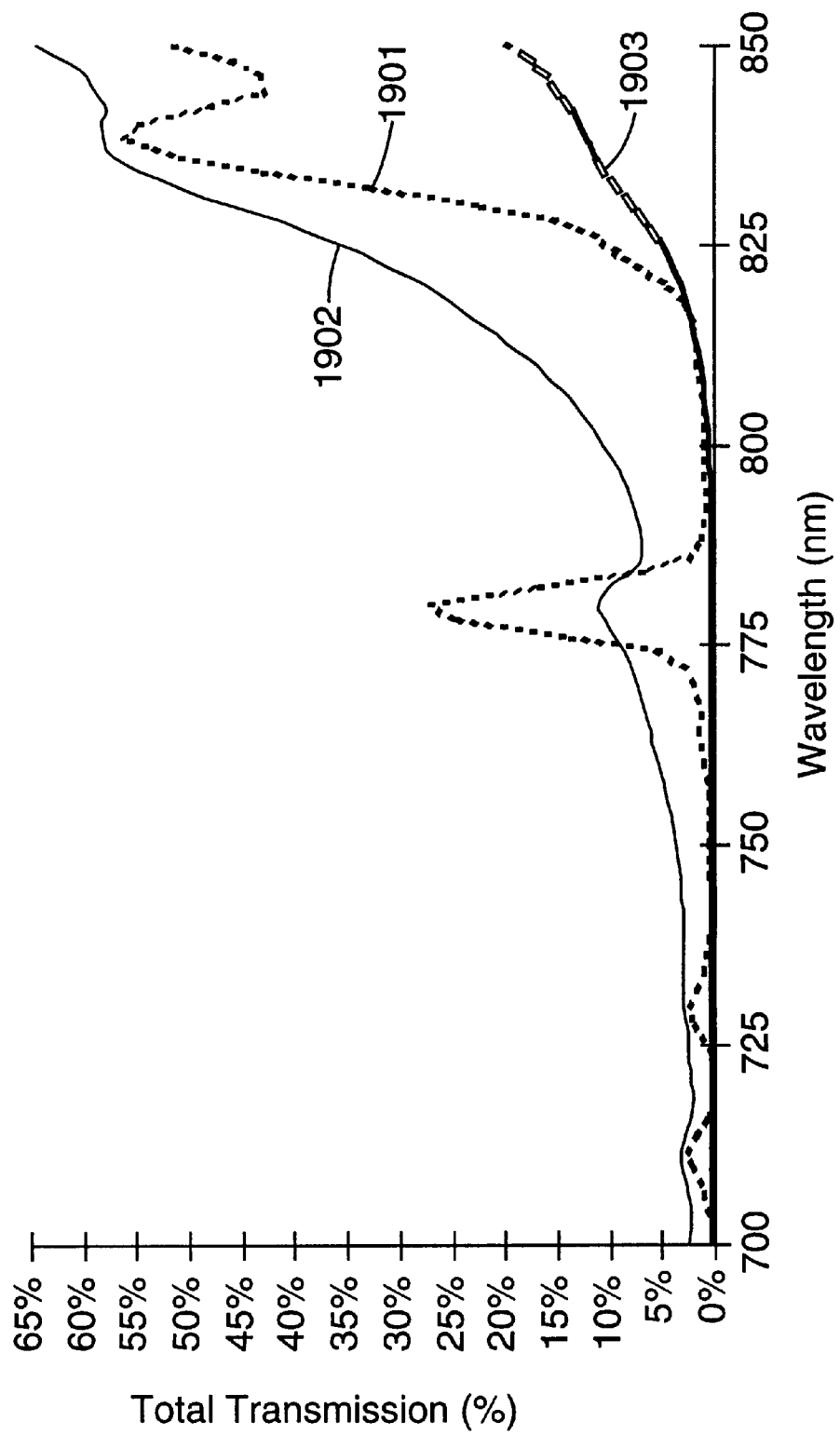
FIG. 19 illustrates the transmission spectrum of another multilayer reflector treated in accordance with an embodiment of the invention.

Example 8 demonstrates an increased transmission of light of the polarization state normally reflected by a multilayer reflective polarizer. In FIG. 19, curve 1901 illustrates the transmission spectrum for light of the reflection polarization state incident on an untreated reflective polarizer. Curve 1902 illustrates the transmission of light of the reflection polarization state though the reflective polarizer where both sides of the reflective polarizer were treated with a polarization preserving diffuser. The diffuser was a diffuse adhesive of the type described in PCT published Patent Application No. WO 97/01610. Curve 1903 illustrates the transmission of the leaked light when viewed through an analyzer (crossed polarizer). As can be seen, increased transmission of light having the reflection polarization state can be obtained without significantly altering the polarization state of the light. Where it is not necessary to maintain the polarization state of the light, an even greater increase in transmission can be obtained.

Figure 20:
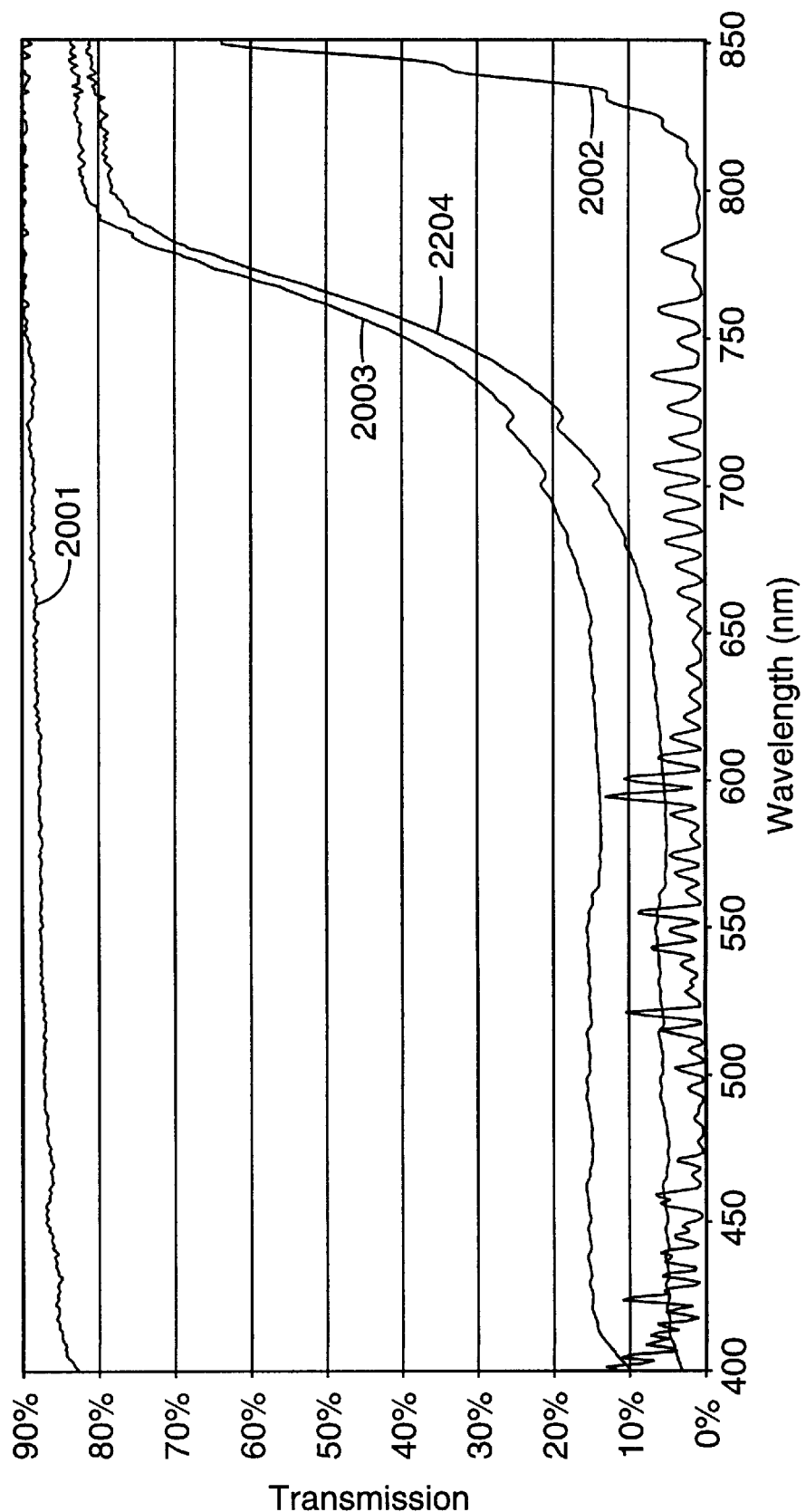
FIG. 20 illustrates the transmission spectrum of another multilayer reflector treated in accordance with an embodiment of the invention.

Example 9, depicts various treatments of a multilayer reflective polarizer, similar to the reflective polarizer film, DBEF, commercially available from 3M company. FIG. 20 illustrates the transmission spectrum for such a film treated with various diffuser coatings. Curves 2001 and 2002 depict the transmission of light polarized in the pass and reflection direction of an untreated reflective polarizer, respectively. Average visible transmissions are 87% and 2.7%, respectively. Curve 2003 depicts the transmission spectrum for light polarized in the reflection direction where both sides of the film were treated with a diffuser coating. The average visible transmission of the double-sided coated film is about 15.1%. Curve 2004 illustrated the transmission of light that remains polarized in the reflection direction. An absorbing polarizer was used as an analyzer to determine how much of this induced transmission was due to depolarization and what percentage was due to the spectral shifting effect described above.

The diffuser used to obtain the spectra of FIG. 20 was composed of 5-micron diameter spherical beads of index 1.46 in a UV cured polymer matrix of index 1.595. Such a large index difference provides strong scatterers. However, as seen from FIG. 20, such a strong scatterer also causes some depolarization of the light. The diffuser was coated on both sides with the UV curable resin loaded with 10% by weight of the spherical beads. A thicker diffuser with a smaller bead/matrix index differential may be used to induce a similar amount of light leak with less depolarization. Spherical beads typically provide the least amount of depolarization. The spectrum illustrates an average transmission of at least 6.2% (an increase of more than 3.5%) neglecting any effect due to possible surface reflections from the polarizer at higher angles.

Figure 21:
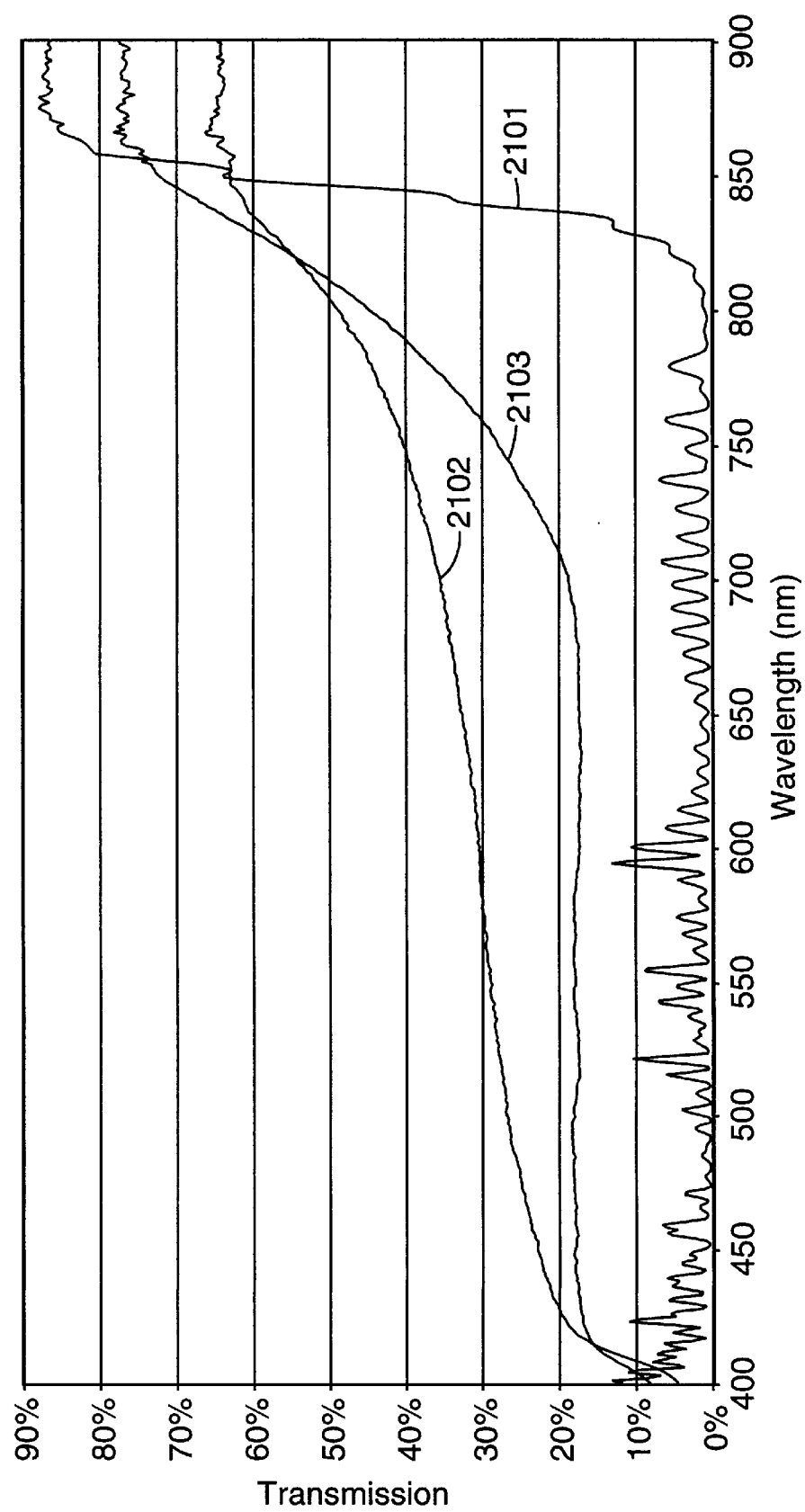
FIG. 21 illustrates the transmission spectrum of another multilayer reflector treated in accordance with an embodiment of the invention.

Example 10 illustrates another polarizer having increased transmission. Greater leakage can be induced in a reflective polarizer by treating its surfaces with coatings that scatter light at larger angles as illustrated with the spectrum of FIG. 21. Curve 2101 illustrates the transmission spectrum for light polarized along the reflection (extinction) axis of the untreated film. Curve 2102 illustrates the transmission when both sides of the film are treated with a diffuser. In this case the film was coated with a diffuser having an UV curable resin loaded with 22% by weight of the spherical beads. The average transmission of a double-sided coated film is about 27%. Curve 2103 illustrates the transmission spectrum when only one side of the film is coated. In this case the average transmission is about 17%. The increase in transmission of the film coated on only one sided is primarily attributable to depolarization.

The depolarization of light caused by the diffuse coating may be undesirable in certain applications. In certain applications it may be desirable to maintain polarization integrity while both transmitting and reflecting predetermined portions of polarized light. As noted above, polarization is found to be substantially preserved when the multilayer film is treated using a structured surface to introduce light into the multilayer stack at angles beyond the normal critical angle dictated by Snell's law. Example 11 illustrates one example of such a treatment. In this example a multilayer reflective polarizer film of the type used above was treated with a structured Optical Lighting Film (OLF) available from 3M Company. This film is of the same general construction as Brightness Enhancement Film (BEF) also available from 3M Company. The OLF film had a repeat prism pitch of approximately 178 μm. The prismatic grooves were oriented parallel to the pass direction of the reflective polarizing film. This film was placed in the spectrophotometer with the pass direction oriented vertically. The incident beam was polarized horizontally to measure the transmission of the reflection (extinction) axis.

Figure 22:
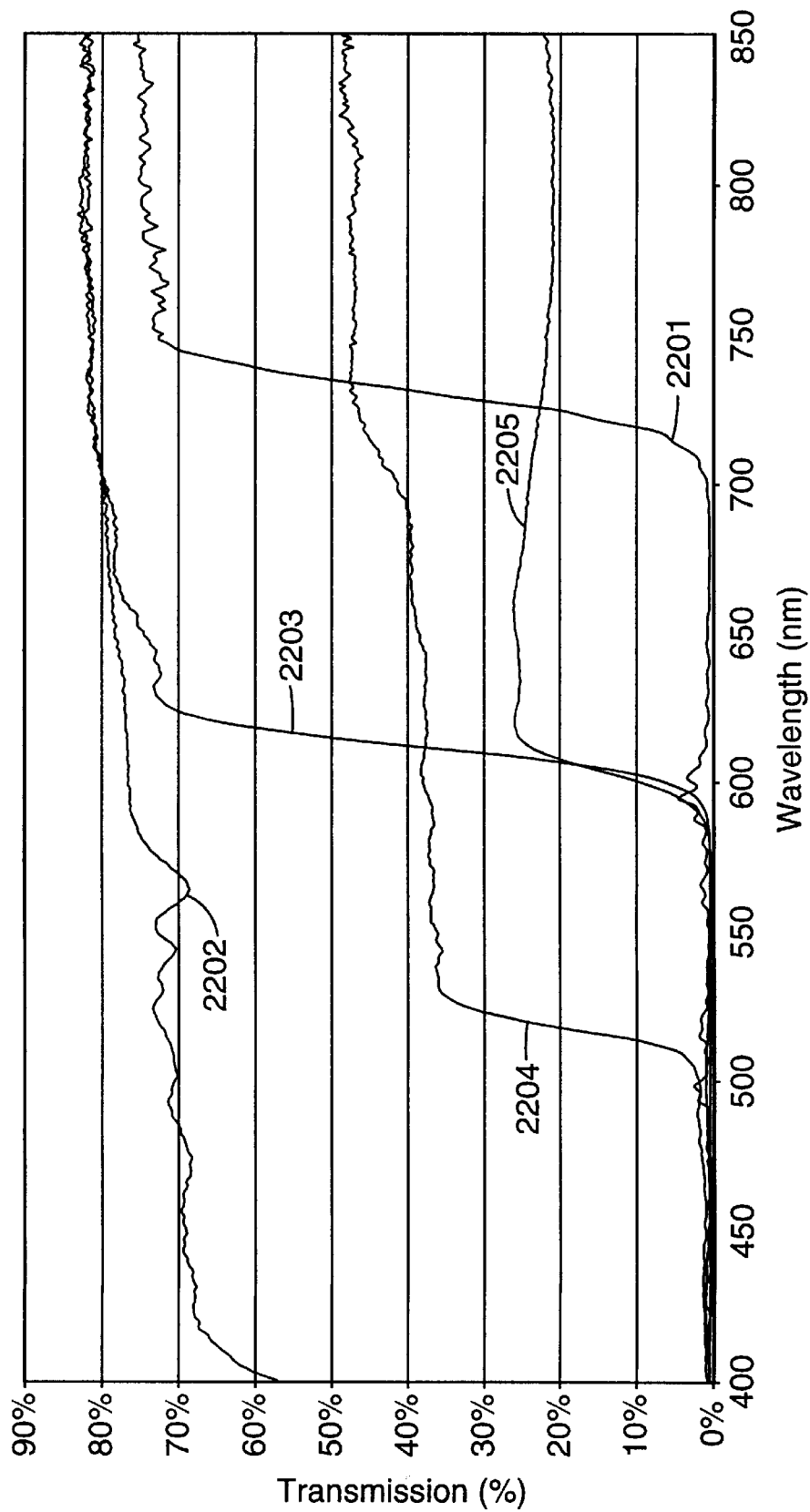
FIG. 22 illustrates the transmission spectrum of another multilayer reflector treated in accordance with an embodiment of the invention.

FIG. 22 illustrates transmission spectrum of various films treated with such structure films. Curves 2201 and 2202 depict the transmission of the untreated film with light incident on the film at 45 degrees and polarized along the reflection (extinction) and the pass axes, respectively. Curve 2203 depicts the transmission spectrum for light polarized along the reflection axis and incident at 45 degrees on a film having both sides treated with OLF. As illustrated in FIG. 22, the transmission spectrum for the red edge of the extinction spectrum is shifted to 600 nm compared to 730 nm for the base film. Curve 2204 illustrates the transmission spectrum for light polarized along the reflection axis and incident at 60 degrees on a film having both sides treated with OLF. Note that the shift in red edge is larger. The lower overall transmission is primarily attributable to shadowing effects from adjacent prisms. It is noteworthy that the reflective polarizer used in the above examples was constructed of relatively high index of refraction materials (i.e., PEN and CoPEN). The high index makes it more difficult to shift the bandedge far enough to cover the visible spectrum as described more fully above.

In Example 12, hybrid treatments of structured surfaces and diffusing coatings were used to produce an increased transmission effect while substantially preserving polarization. The reflective polarizer film was treated on one side by laminating OLF and on the opposing side the film was treated by coating the surface with a diffuser having a 10% loading of spherical beads. The resulting transmission spectrum for light incident at 45 degrees, with the OLF side towards the polarized light source, is illustrated by Curve 2205. The OLF sends the light beam into the polarizer at angles past the critical angle without depolarizing the light. The diffuse coating acts to scatter at least a portion of the light out of the film below the critical angle.

In an alternative embodiment, the diffusing treatment applied to one or both surfaces of the multilayer reflecting polarizer could be an asymmetric or polarizing diffuser, preferably one that scatters light mainly into the forward direction. Many such polarizing diffusers are described in the art.

EXAMPLE 13

Figure 23:
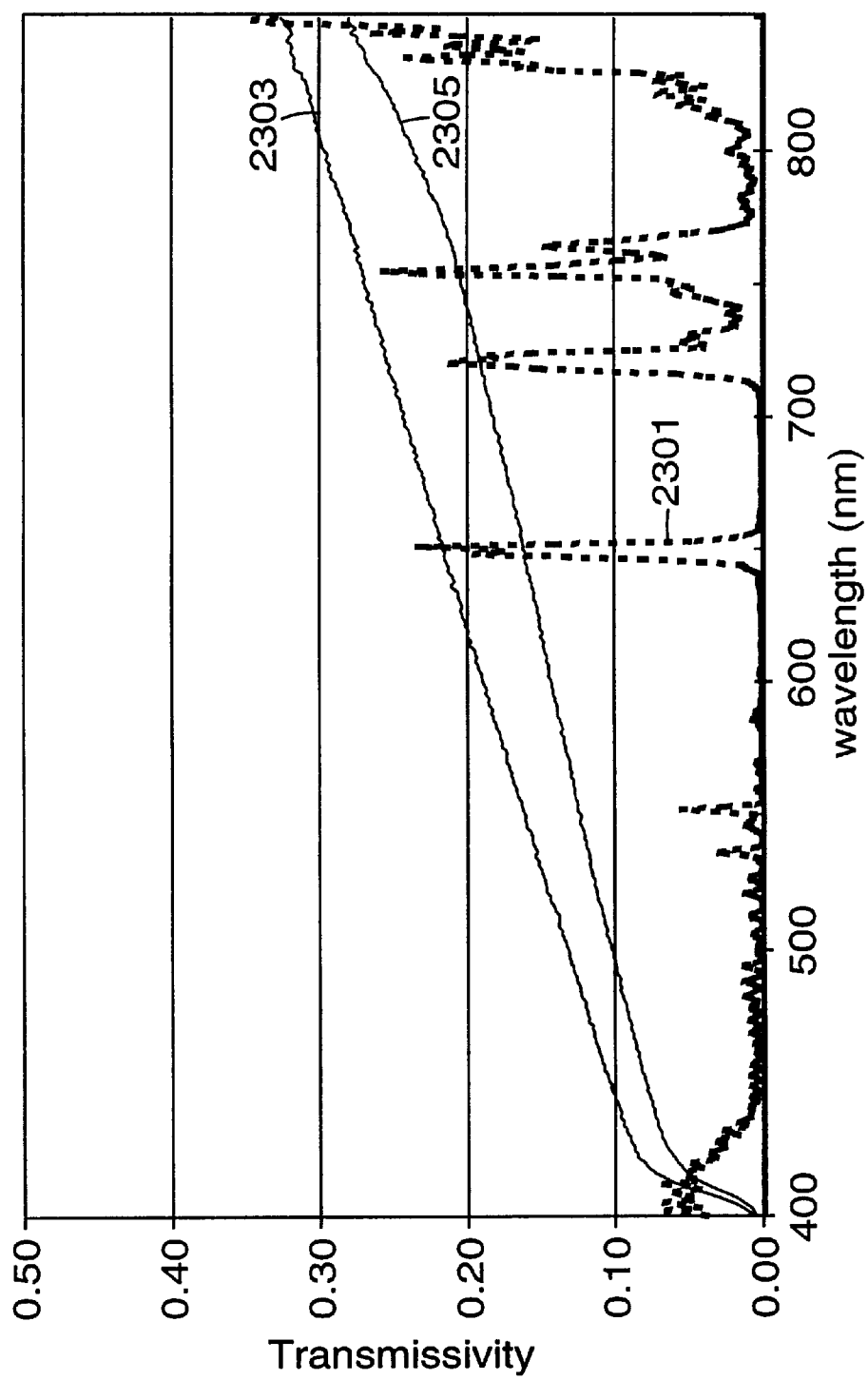
FIG. 23 illustrates the transmission spectrum of another multilayer reflector treated in accordance with an embodiment of the invention.

Example 13 illustrates the article construction discussed above in relation to FIG. 9 involving more than one multilayer stack. The first stack is a coextruded multilayer reflective mirror incorporating alternating layers of biaxially oriented PEN and PMMA of the type described above in connection with Example 1. Curve 2301 of FIG. 23 illustrates the transmission spectrum of untreated mirror film. This mirror film was treated on both sides by lamination of a diffusing film, which resulted in the transmission spectrum given by curve 2303 of FIG. 23. Following lamination of the diffusers a multilayer reflecting polarizer film was laminated to one side. The resultant transmission spectrum is illustrated by curve 2305 This polarizing film is available from 3M Company as Dual Brightness Enhancement Film (DBEF). Such a polarizing film is very efficient, transmitting close to 100% of light having one polarization state (disregarding surface reflections) and leaking only a small percent of the orthogonal polarization state. While the transmitted light illustrated by curve 2305 is polarized by the polarizing film, the transmitted light of the article is not reduced by 50% upon lamination of the polarizer. Instead, as shown by comparing curve 2303 with curve 2305, it can be seen that the transmission is reduced by only about 25%. This results from recycling and conversion of light initially reflected by the polarization film. Upon first incidence of the light on the polarizer, about 50% is reflected by the polarizer and is highly polarized. The reflected polarized light is depolarized and returned by the mirror and diffusing films to the polarizer whereupon 50% is again transmitted. For a given ray of light, this process repeats until all light is transmitted, reflected, or absorbed. The end result is that the recycling phenomenon provides a transmission gain of polarized light of about 50%. Applications of this invention that involve extraction of light for room or office lighting systems may benefit from the use of polarized lighting for reduced glare.

In another embodiment, the reflecting polarizer in this example could be a diffuse reflecting polarizer of the type described in U.S. Pat. No. 5,783,120, entitled Method for Making an Optical Film, the contents of which are incorporated herein by reference. Alternatively, or in combination with this construction, the diffusing film applied to the mirror film could comprise the same diffuse reflecting polarizer. Alternative constructions to this and other embodiments described above could also involve the use of asymmetric diffusers of the forward scattering type. The asymmetry could be in terms of scattering angle or in polarization, or both.

EXAMPLE 14

Example 14 illustrates further advantages treating the surfaces of a reflector with a gradient. A dielectric visible mirror film of the type described above was screen printed with white, diffusing ink on one surface with a 95% nominal coverage area and on the opposite side in a vignette with a gradient from 95/5 to 5/95 (printed/non-printed) nominal area coverage pattern. Before coating, the visible mirror film had a dichroic colored appearance in transmission, which was accentuated when viewed with fluorescent light sources. After treatment, any color of the film observable in transmission did not change based on the angle of incidence. Absorption of the printed film was acceptably low, measuring approximately 3% at 550 nm.

The controlled pattern of diffusion produced a film that exhibited a highly specular reflection even from the region of the film having 95% coverage. Reflected images were easily discernible to the eye, even in these high dot density areas. In this manner a film was produced that exhibited an acceptable transmitted color, which did not substantially shift with angle, even under fluorescent light, had specular character in reflection, allowing images to be discerned while also having a useful level of transmission (e.g., on the order of 5–15%)

Figure 24:
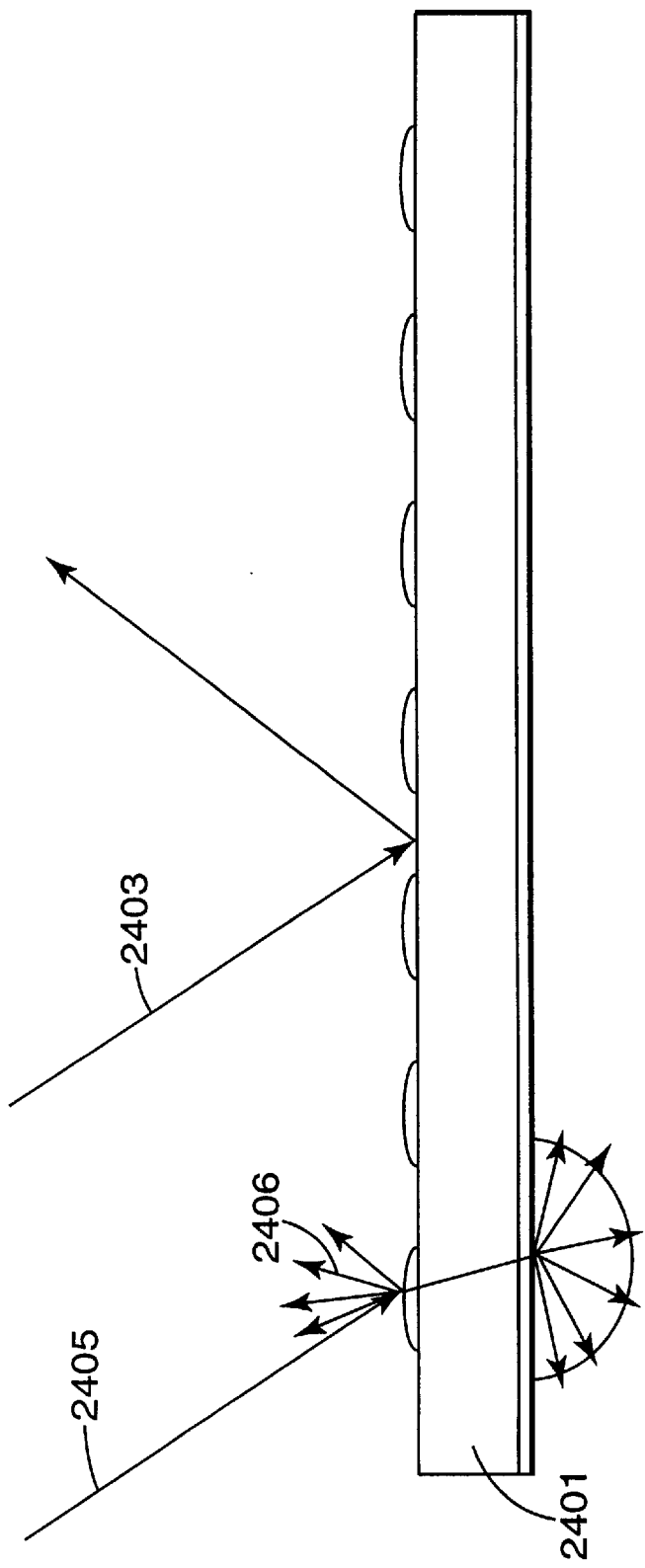
FIG. 24 illustrate diffuse and specular characteristics of a reflector in accordance with one embodiment of the invention.

FIG. 24 illustrates the operation of the printed film. On a small scale, the treated film 2401 will specularly reflect a portion of light as depicted by ray 2403 from untreated regions of the film not. A portion of light 2405 incident on treated regions of the film will be diffusely reflected 2406 while another portion of the light 2405 will be diffusely transmitted 2407. The spatial separation between the specularly reflected light and the diffusely reflected light in not generally observable on a macro scale. Thus, the treated film exhibits both diffuse and specular reflection characteristics.

Figure 25:
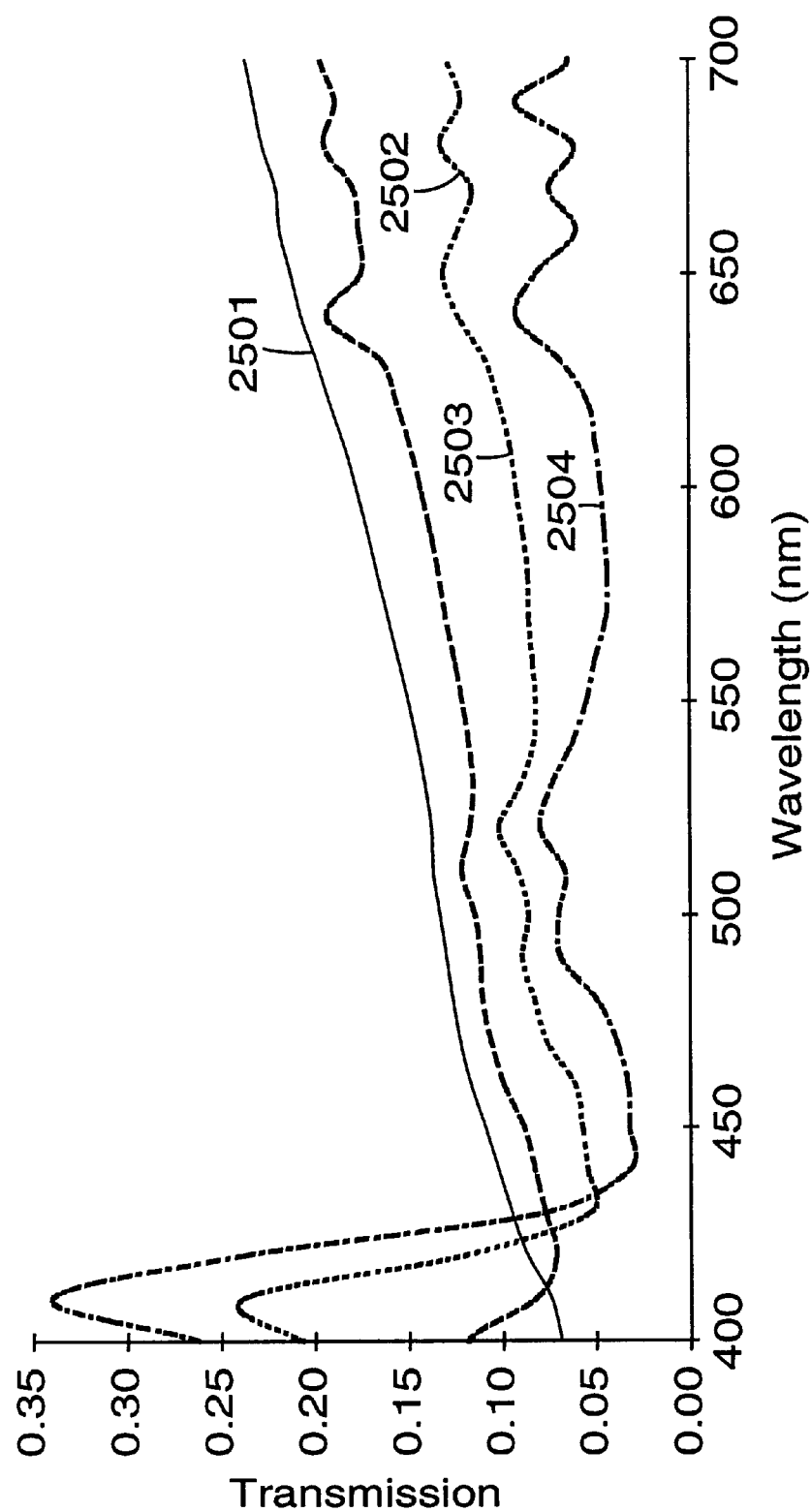
FIG. 25 illustrates the transmission spectrum of variously treated reflectors in accordance with another embodiment of the invention.
Figure 26:
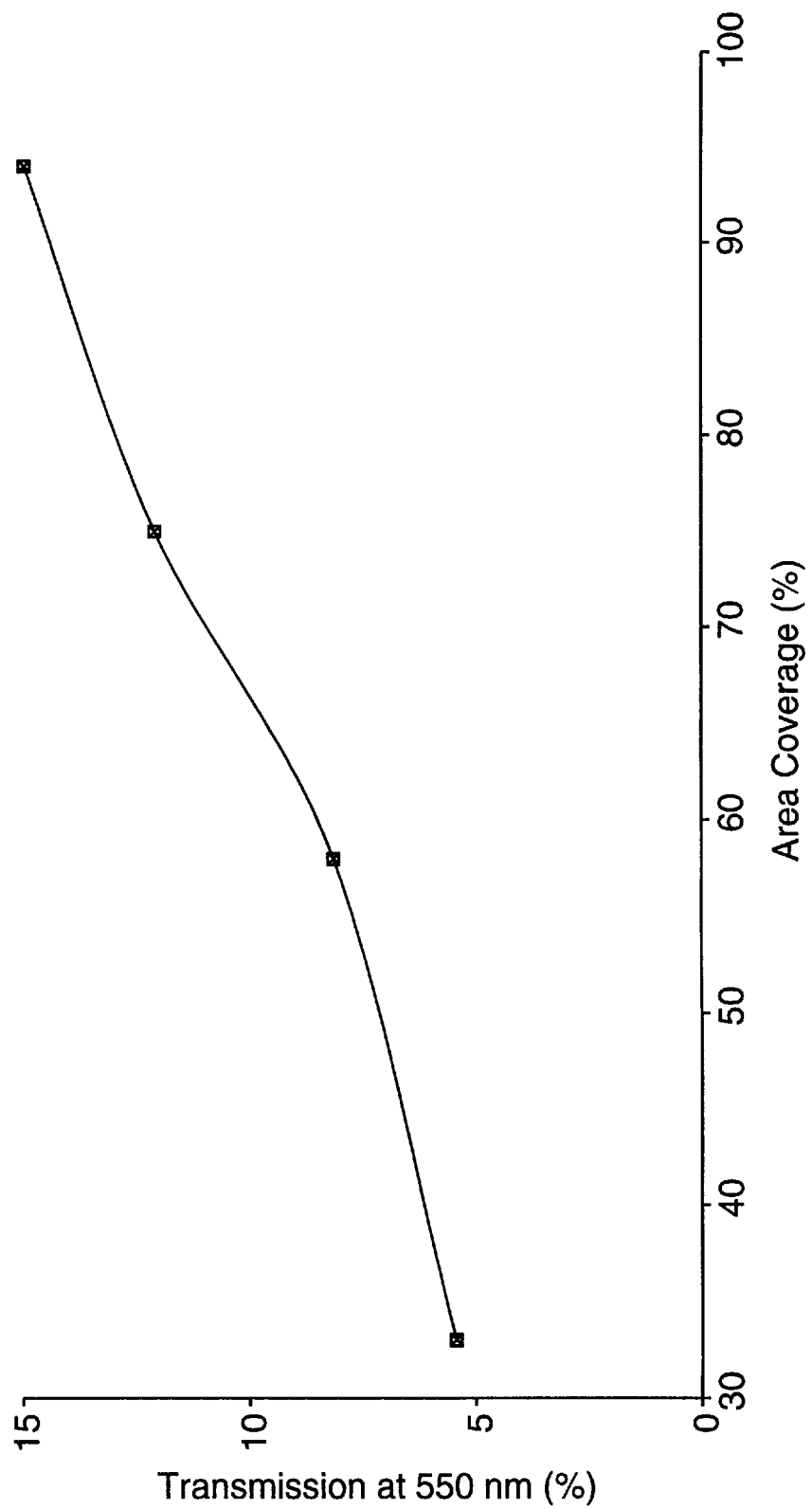
FIG. 26 illustrates a relationship between transmission and treatment in accordance with still another embodiment of the invention.

FIG. 25 illustrates the transmission spectra as a function of wavelength of light for various portions of the film having different levels of treatment. Curve 2501 illustrates the transmission of light through a portion of the film treated having 94% of the area covered on the gradient side of the film. Curves 2502, 2503 and 2504 illustrate transmission through the film at portions have 75%, 58% and 33% of the film covered, respectively. As the coverage area of the treatment is increased, the transmission through the film is increased the spectrum as a function of wavelength is smoothed. The smooth spectrum is particularly useful where arc light sources are used since sharp spikes in the spectrum can cause objectionable color in the transmitted light. FIG. 26 illustrates the transmission of light at 550 nm as a function of area coverage.

Screen printing treatments, as well as a number of other treatments as described above, can provide a number of useful articles. In many applications, it is desirable to adhere the leaky mirror film to a transparent substrate such as polycarbonate. A well-known problem in the plastics industry is that the reaction of adhesives with polycarbonate causes outgassing, resulting in physical and visual defects in laminated film constructions. One approach in accordance with the present invention uses a dot-printed adhesive to allow the gas to escape without resulting in a defect. A diffusing adhesive serves both the function of allowing gas to escape from the reaction, and facilitates transmission of light through the reflector.

While numerous applications of selectively treated reflectors will be evident upon review of the present application, the following non-limiting examples are provided. The present invention is applicable to a number of lighting applications. For example, a treated film may be used to from a transmissive louver for a luminaire. The louver may have the property of both transmitting and reflecting light. One advantage of such a louver is that the ceiling is more evenly illuminated than a louver using a specular reflector. The specular reflection component of the louvers retains the ability to control the downward directing of light.

One louver, illustrated in FIG. 27, specularly reflects a portion of light from both sides while diffusely transmitting light. The louver of FIG. 27 includes two dielectric reflectors 2701A and 2701B of the type described above, separated by a diffusing layer 2703. The outside surfaces 2705A and 2705B of the reflectors are selectively treated to provide localized regions of diffusion (e.g., by screen printing as described above). The controlled lead through a dielectric reflector could also be used to match the luminance of a lighting fixture to that of the ceiling, for example, via a pendant hung luminaire where light is leaked downward. It may also be desired to leak light upward or to the sides in certain types of luminaires.

Figure 28B:
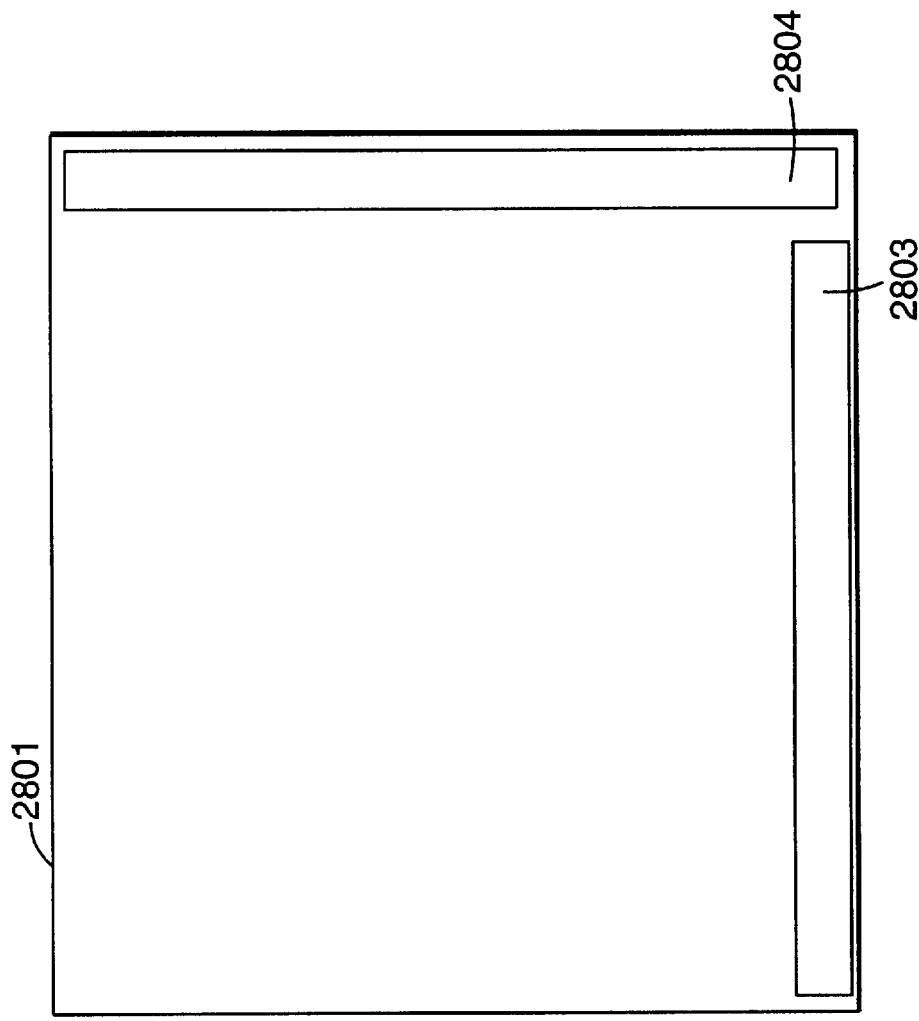
FIGS. 28A and 28B illustrate a light module in accordance with another embodiment of the invention.
Figure 28A:

As noted above, the present invention may be used to produce thin, efficient light modules or signs. Extraction of light out through a reflector, unlike a prismatic lighting film, use the advantage of being able to light the sign from two orthogonal directions. As illustrated in FIGS. 28A and 28B, a light box 2801 may have orthogonal light sources 2803 and 2804, a highly reflective back reflector and a selectively treated (e.g., by printing on opposing surface) front reflector 2807 to allow light to be transmitted in a desired shape. In one embodiment, the image to be lighted could be printed on the interior of face of the reflector 2807.

Appropriate selection of exterior dot density could be used to give the light module or sign a semi-metallic appearance in the off state.

As will be appreciated, various effects can be used to obtain different daytime and nighttime viewing. For example, automotive panels or trim (interior or exterior) can be made, which in the daytime appear metallic, but when backlit at night, glow with a color or message. Control levers and buttons could use this method as well.

While the present invention has been described above with reference to various embodiments and examples, it should not be limited to the specifics of the embodiments and examples. Rather, the intention is to fully cover the invention as set out in the attached claims.

What is claimed is:

1. A dielectric reflector comprising:
    a dielectric stack of optical repeating units including at least two different materials having different refractive indices, the stack having a critical angle at which light propagating in the stack will undergo total internal reflection at an interface of the stack with air;
    a first surface optically coupled to the dielectric stack and selectively treated to couple at least a portion of light incident on the first surface into the dielectric stack at a propagation angle above the critical angle; and a second surface optically coupled to the dielectric stack and selectively treated to couple at least a portion of light propagating in the dielectric stack at an angle above the critical angle out of the stack, wherein a coupling efficiency of at least one of the first and second surfaces, for coupling light into or out of the stack with a propagation angle above the critical angle, is different at different regions of the dielectric stack.

2. A dielectric reflector as recited in claim 1, wherein at least a portion of one of the first and second surfaces has a graded treatment such that the coupling efficiency changes along a plane of one of the first and second surfaces.

3. A dielectric reflector as recited in claim 1, wherein the dielectric stack includes layers of at least two polymeric materials, at least one polymeric material exhibiting strain induced birefringence.

4. A dielectric reflector as recited in claim 1, wherein at least a portion of one of the first and second surfaces is treated to diffuse light.

5. A dielectric reflector as recited in claim 1, wherein at least a portion of one of the first and second surfaces is structured to refract light.

6. A dielectric reflector as recited in claim 1, wherein at least a portion of opposing locations of the first and second surfaces are treated to diffuse light.

7. A dielectric reflector as recited in claim 1, wherein at least a portion of opposing locations of the first and second surfaces are treated with a treatment selected from the group consisting of structured surfaces, diffraction gratings, surface holograms, and volume hologram.

8. A dielectric reflector as recited in claim 1, wherein the dielectric reflector comprises a mirror.

9. A dielectric reflector as recited in claim 8, wherein the mirror has a reflection band that substantially reflects visible light.

10. A dielectric reflector as recited in claim 8, wherein the mirror has a reflection band that substantially reflects infrared light and transmits visible light.

11. A dielectric reflector as recited in claim 1, wherein at least one of the first and second surfaces is treated over regions corresponding to a graphic.

12. A light module or sign incorporating the dielectric reflector as recited in claim 11.

13. A light module or sign as recited in claim 12 further comprising a light source and a highly efficient mirror disposed to reflect light from the light source to the dielectric reflector.

14. A light module or sign as recited in claim 12 wherein the dielectric reflector is treated on both surfaces with the graphic in registration.

15. A dielectric reflector as recited in claim 11, wherein the treatment of the at least one of the first and second surfaces is removable.

16. A dielectric reflector as recited in claim 1, wherein the dielectric reflector comprises a reflective polarizer.

17. A selectively transmissive reflector comprising:

a dielectric stack of optical repeating units including at least two different materials having different refractive indices, the dielectric stack being designed to substantially reflect light of a predetermined wavelength when the light propagates in the film at a propagation angle within a first group of angles and to substantially transmit the light when the light propagates in the film at a propagation angle within a second group of angles, one of the first group and the second group of angles including angles above a critical angle;

a first surface optically coupled to the dielectric stack and selectively treated to couple at least a portion of light at the predetermined wavelength, having a propagation angle in the dielectric stack above the critical angle, between the dielectric stack and a medium surrounding the first surface; and a second surface selectively treated to couple at least a portion of light, having a propagation angle in the dielectric stack above the critical angle, between the dielectric stack and a medium surrounding the second surface, wherein a coupling efficiency of at least one of the first and second surfaces for coupling light having a propagation angle in the dielectric stack that exceeds the critical angle is different for different regions of the dielectric stack.

18. A selectively transmissive reflector comprising:

a dielectric stack of optical repeating units including at least two different materials having different refractive indices, the dielectric stack having a first reflection characteristic for light of a particular wavelength propagating in the stack at a propagation angle less than a first angle and a second reflection characteristic for light of the particular wavelength propagating in the stack at a propagation angle greater than a second angle, the second angle being greater than or equal to the first angle;

a first surface optically coupled to the dielectric stack and selectively treated to couple at least a portion of light at the particular wavelength into the dielectric stack at a propagation angle in the dielectric stack above the second angle; and a second surface selectively treated to couple at least a portion of light at the particular wavelength and propagating in the stack at a propagation angle above the second angle out of the stack, wherein a coupling efficiency of at least one of the first and second surfaces is different for different regions of the dielectric stack.

19. An optical film, comprising:

a multilayer stack of dielectric materials including layers of at least two different materials having different refractive indices along at least one in-plane axis of the film, the layers forming consecutive parallel planes, the multilayer stack being bounded by a first surface layer having an index of refraction $n_1$ and a second surface layer;

an input layer disposed on at least a portion of the first surface layer to direct at least a portion of light incident on the input layer into the first surface layer at a transmission angle $\theta_t$, measured from an axis normal to the plane of the first surface layer, which satisfies the relationship $$\theta_t < \sin^{-1}(1/n_1);$$

and an output layer disposed on at least a portion of the second surface layer to permit at least a portion of light transmitted through the multilayer stack at the transmission angle $\theta_t$ to exit the optical film through the output layer.

20. A selectively transmissive reflector, comprising:

a multilayer dielectric stack having a first surface and a second surface, the dielectric stack substantially reflecting light within a predetermined bandwidth, a bandedge of the bandwidth being defined by a maximum angle of propagation through the dielectric stack for light incident directly on the first surface;

an input layer formed on at least a portion of the first surface to permit light within the predetermined bandwidth to enter the dielectric stack at a propagation angle which exceeds the maximum angle; and an output layer formed on at least a portion of the second surface to prevent total internal reflection of the light propagating through the dielectric mirror at the propagation angle which exceeds the maximum angle such that light is selectively transmitted through the mirror at locations corresponding to the input and output layer.

21. A selectively transmissive mirror, comprising:

a multilayer stack of dielectric materials having a first and second surface and including layers of at least two different materials having different refractive indices along at least one in-plane axis of the film, the stack substantially reflecting light incident on the film within a predetermined bandwidth, the bandedge of the bandwidth being selected to reflect light propagating through the dielectric stack at a predetermined propagation angle;

a first treatment applied to at least a portion of the first surface, wherein at least a portion of any light within the predetermined bandwidth incident on the treated portion of the first surface is directed into the dielectric stack at a propagation angle which exceeds the predetermined propagation angle and wherein at least a portion of any light propagating through the dielectric stack from the second surface at an angle which exceeds the predetermined propagation angle exits the dielectric at the treated portion of the first surface; and a second treatment applied to at least a portion of the second surface, wherein at least a portion of any light within the predetermined bandwidth incident on the treated portion of the second surface is directed into the dielectric stack at a propagation angle which exceeds the predetermined propagation angle and wherein at least a portion of any light propagating through the dielectric stack from the first surface at an angle which exceeds the predetermined propagation angle exits the dielectric at the treated portion of the second surface, the second treatment being applied such that an amount of any light within the predetermined bandwidth directed into the dielectric stack through the second surface at a propagation angle which exceeds the predetermined propagation angle or an amount of any light exiting the dielectric stack through the second surface varies for different portions of the second surface.

* * * * *